United States Patent [19]

Seiler et al.

[11] 4,449,246

[45] May 15, 1984

[54] ORDERWIRE COMMUNICATION SYSTEM

[75] Inventors: Norman C. Seiler, West Melbourne, Fla.; Thomas J. Nixon, Gaithersburg, Md.; George A. Waschka, Jr., Melbourne, Fla.

[73] Assignee: Harris Corporation, Melbourne, Fla.

[21] Appl. No.: 146,164

[22] Filed: May 2, 1980

[51] Int. Cl.³ .............................................. H04B 7/20
[52] U.S. Cl. ........................................... 455/9; 455/16; 455/20; 375/4
[58] Field of Search ....................... 455/6, 7, 8, 9, 32, 455/15, 17, 16, 87, 88, 5, 20; 179/2 DP; 340/505; 333/2, 3; 375/3, 4

[56] References Cited

U.S. PATENT DOCUMENTS

| 3,487,310 | 12/1969 | Bateman | 455/15 |
| 4,112,467 | 9/1978 | Ogawa | 358/257 |
| 4,194,151 | 3/1980 | Gregersen et al. | 455/15 |

Primary Examiner—John C. Martin
Assistant Examiner—Edward L. Coles
Attorney, Agent, or Firm—Antonelli, Terry & Wands

[57] ABSTRACT

An orderwire scheme for a multichannel repeated communication network contains an auxiliary communication link that is coupled to communication sites along the network and is configured of a pair of orderwire links each formed of a conventional interstitial copper wire pair. To carry out supervisory functions with respect to each of the stations along the communication link, messages are conveyed from a control facility coupled to or as part of the network to respective stations along the link in the form of command instructions. These messages may contain a request for information from the addressed site as to equipment conditions at the site or a directive that the equipment at the site perform a particular task. In reply to the command message sent to it the addressed site returns a response message back to the control facility representative of the action taken including any data requested by the instructions. In addition to providing a distributed communication link over which supervisory command and response messages can be transmitted among the stations along the orderwire link, a further facility for conveying voice communications over the same orderwire link is provided. In order to implement the exchange of command and response messages among the various sites of the network, supervisory signals are transmitted using digitally encoded ON/OFF keying of frequency tone signals.

78 Claims, 8 Drawing Figures

COMMAND MESSAGE
(ONE WORD)

RESPONSE MESSAGE
(3 WORDS)

| WORD | BYTE 2 | BYTE 1 |
|------|--------|--------|
| 1 | 2ND BYTE CMD DATA | 1ST BYTE CMD DATA |
| 2 | RESPONSE BITS | RESPONSE BITS |
| 3 | RESPONSE BITS | — |

ORDERWIRE COMMUNICATION SYSTEM

FIELD OF THE INVENTION

The present invention relates to communication systems and is particularly directed to a scheme for carrying out parameter monitoring and maintenance communications attendant to controlling the operation of a repeatered, multichannel communications network.

BACKGROUND OF THE INVENTION

In copending patent application Ser. No. 149,291, filed May 12, 1980 entitled Repeatered, Multichannel Fiber Optic Communication Network Having Fault Isolation System, by P. Casper et al, and assigned to the assignee of the present application, there is described a communication network for conveying high density, high data rate digital signalling traffic over plural fiber optic channels between geographically separated terminal stations. Distributed along the fiber optic links between the terminal stations are a plurality of repeater sites at which the signals are regenerated as they travel over the fiber optic cables. In addition to the normally active fiber optic channels over which digitized data signals are transmitted in the form of an encoded optical pulse stream, the network described in the above identified application contains auxiliary equipment that serves as a backup in the event of a failure in the normally used links.

In this type of system, as well as other repeatered and multichannel environments, it is often required that the communication links over which the data is transmitted be augmented or served by an auxiliary monitor and control subsystem that performs required housekeeping chores with respect to the transmission channels and regenerator equipment distributed along the communication links. Preferably, this auxiliary equipment should operate independently of the main transmission section of the network so that an interruption or degradation of service over the data-conveying links will not impair the operation of the monitor and control function of the supervisory equipment.

SUMMARY OF THE INVENTION

In accordance with the present invention, there is provided a new and improved facility for carrying out supervisory signalling tasks necessary to meet the operational and maintenance demands of a repeatered, multichannel communication system. While the present invention has particular utility in conjunction with the operation of the network described in the above-referenced application, it should be understood that the scheme described herein is not limited to use with only such a network but is generally applicable to any type of multistation network wherein the respective sites between which communications are to take place are distributed along a common communication highway. However, in order to facilitate an appreciation of multiple applications of the invention and the manner in which it interfaces with an overall communication network, the environment of a multichannel repeatered network, such as that described in detail in the above-identified application, will be referenced where appropriate. Advantageously, the orderwire communication system of the present invention is incorporated in the fiber optic communication network described in the above identified application and for a more detailed explanation of the environment itself attention may be directed to such application. In the description of the present invention to follow, consideration will be given to the more general application of the invention in order that its multiple system applicability may be fully appreciated.

For the purpose of providing an auxiliary communication link to the various communication sites along the network the present invention is configured of a pair of orderwire links each formed of a conventional interstitial copper wire pair to which each site or station in the network is connected, thereby forming a distributed orderwire communication network. These individual communication sites may include the terminal station equipment at opposite ends of the network and the signal regenerator equipment at the repeater sites disposed between the terminal stations. In carrying out supervisory functions with respect to each of these stations along the communication link, messages are conveyed from a central control facility coupled to or as part of the network to respective stations along the link in the form of command instructions. These messages may contain a request for information from the addressed site as to equipment conditions at the site or a directive that the equipment at the site perform a particular task. In reply to the command message sent to it, the addressed site returns a response message back to the central control facility representative of the action taken including any data requested by the instruction. In this manner, monitor and control equipment at the central control facility is equipped to observe and control the operation of the communication equipment at the various sites along a transmission link and to thereby take corrective maintenance action where and when required.

In addition to providing a distributed communication link over which such supervisory command and response messages can be transmitted among the stations along the orderwire link, the present invention offers a further facility for conveying voice communications over the same orderwire link. As those familiar with repeatered communication networks are aware, the repeater sites are often located in a remote geographical environment where communication facilities that would otherwise assist maintenance personnel in the performance of tasks relative to the network equipment are unavailable. Pursuant to the present invention the same orderwire link that serves the monitor and control equipment in the exchange of command and response messages among the network sites is also employed for maintenance voice communications. As a result, a complete auxiliary communication system attendant to the needs of the main communication network is provided.

To implement the exchange of command and response messages among the various sites of the network, supervisory signals are transmitted using digitally encoded amplitude modulation of frequency tone signals. In considering the general configuration of the orderwire system, each terminal station at respective opposite ends of the network may contain a transmitter facility for directing command messages along one of the interstitial pairs to any repeater site along that pair and to the remote terminal station. The terminal station at one end of the link may be considered the west terminal station with the terminal station at the opposite end of the link being the east terminal station. One orderwire interstitial pair carries messages from east-to-west and the other orderwire pair carries messages from west-to-east.

In each of the embodiments of the invention to be described subsequently in detail, a pair of tone frequencies are provided to delinate communications relative to the terminal stations at the opposite ends of the orderwire. In one embodiment both tone frequencies are transmitted over both the east-to-west and west-to-east links. In a second embodiment one tone frequency is used for east-to-west communications while the other tone frequency is used for west-to-east communications. In the latter instance, each site is configured to be capable of generating a tone carrier independently of another source so that communication continuity with supervisory equipment at the terminal stations may be maintained in the event of a fault or failure at or between stations along orderwire.

In the first embodiment of the invention, from the west terminal station digitally encoded ON/OFF keyed (100% amplitude modulation) tone signals are transmitted at a first frequency $f_1$ over the west-to-east orderwire link to any of the repeater sites or the remote east terminal station. At the repeaters, a response to a command message on frequency $f_1$ is transmitted back to the west terminal station via the east-to-west orderwire link via frequency $f_1$ and the same response message is transmitted over the west-to-east link on frequency $f_2$ to the east terminal station, so that supervisory equipment at both terminal stations may monitor the responses of the repeaters. Similarly, a command message from the east terminal station is encoded at frequency $f_2$ over the east-to-west orderwire pair. At an addressed repeater station a response message is sent back to the east station over the west-to-east orderwire pair on frequency $f_2$ and also forwarded over the east-to-west orderwire pair to the west terminal station at frequency $f_1$. The second embodiment of the invention is somewhat similar to the first embodiment in that digitally encoded amplitude modulated tone signals are transmitted at a first frequency $f_1$ over the west-to-east orderwire link from the west terminal station. At the repeaters, a response to a command message on frequency $f_1$ is transmitted back to the west terminal station via the east-to-west orderwire link by amplitude modulating frequency $f_2$ (instead of frequency $f_1$ as in the first embodiment) and the same response message is transmitted over the west-to-east link to the east terminal station on frequency $f_1$ (not frequency $f_2$ as in the first embodiment), so that supervisory equipment at both terminal stations may monitor the response from the repeaters. A command message from the east station is amplitude modulated onto frequency $f_2$ over the east-to-west orderwire. At the addressed repeater station, a response message is sent back to the east station over the west-to-east orderwire on frequency $f_1$ (not frequency $f_2$ as in the first embodiment) and is also forwarded over the east-to-west orderwire pair to the west terminal station at frequency $f_2$ (not frequency $f_1$ as in the first embodiment).

To implement these command and response messages, each site along the orderwire contains an orderwire communications transceiver module. This module includes a signal interface unit which is coupled to each orderwire pair and performs the function of detecting incoming amplitude modulated tones and in modulating outgoing messages onto a tone for transmission over the orderwire. The signal interface unit also includes audio interface circuitry for combining voice signals with the command and response messages that are coupled through the transceiver module. Each module further contains an encode/decode digital control unit associated with the signal interface unit for accepting and decoding incoming messages addressed to that site and encoding response messages to be transmitted from the site through the signal interface unit. The encode/decode digital control unit is coupled with those devices in the stations that serve the parameter and operation monitoring needs of the orderwire system through which a remote control facility performs its supervisory tasks relative to that particular piece of equipment.

ORDERWIRE SYSTEM CONFIGURATION

Figure 1:
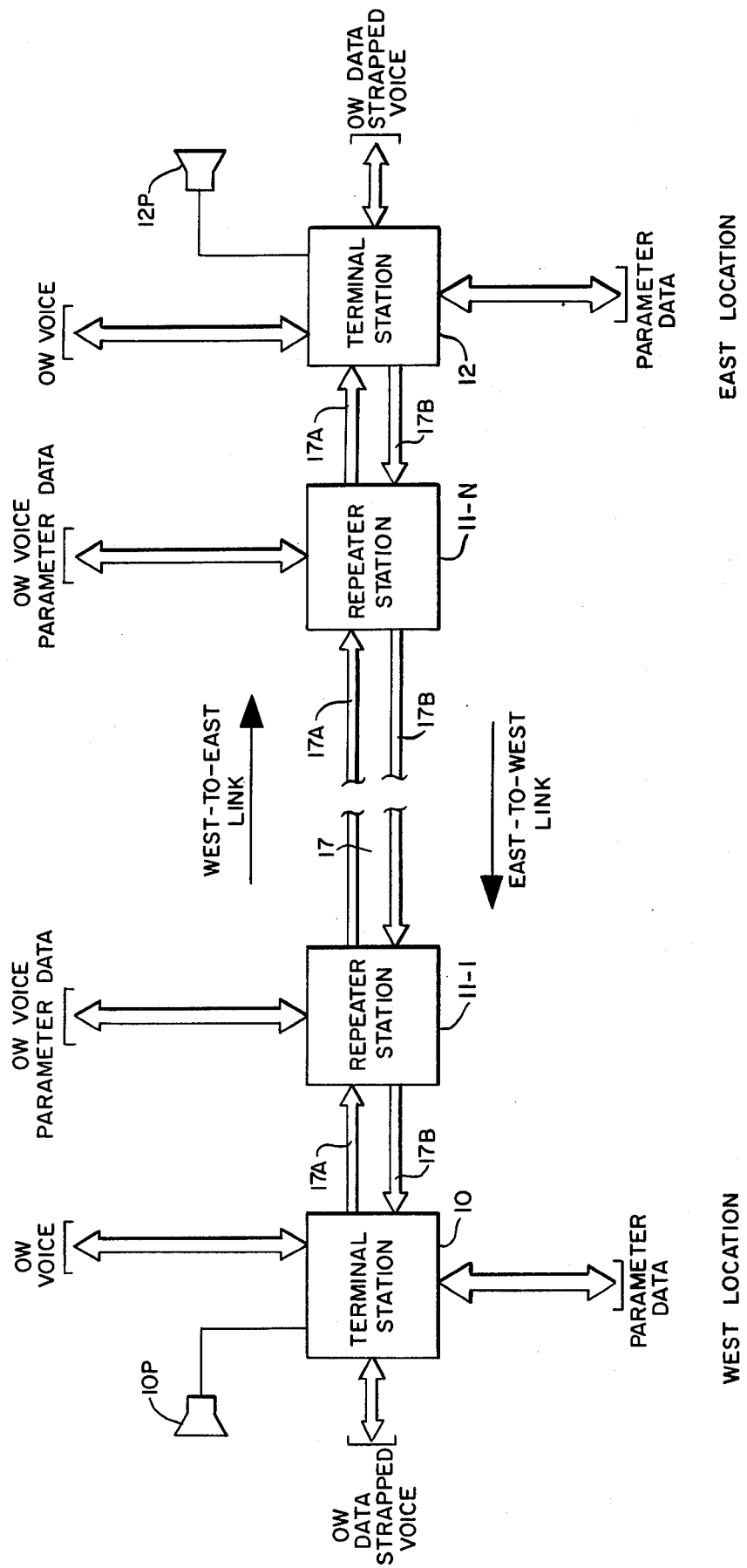
FIG. 1 is a block diagram of an orderwire communication system in accordance with the present invention.

A general block diagram of the orderwire system of the present invention, as may be associated with a multichannel, repeatered communication network is illustrated in FIG. 1. A pair of terminal stations 10 and 12 at opposite ends of the network are coupled to each other and to a number of repeater units 11 - 1 to 11 - N via a twisted pair link 17 made up of a set of orderwire interstitial pairs 17A and 17B, one for west-to-east signalling, the other for east-to-west signalling. As was explained briefly above, orderwire signalling involves general supervisory signalling such as maintenance voice communications, status parameter monitoring, etc. For voice communications, each terminal station and repeater unit is associated with attendant voice communication circuits by way of orderwire voice input and voice output links to an audio transceiver unit such as a conventional headset. Orderwire voice signalling is used for terminal-to-repeater, repeater-to-repeater, and/or terminal-to-terminal voice communications via the twisted pair link by system maintenance personnel. Voice is transmitted in baseband over local orderwire cable sections 17A and 17B with all stations being configured in a party line format.

Thus, terminal station 10 acts as the source terminal for orderwire voice input signals from a maintenance attendant's headset to be coupled west-to-east over twisted pair orderwire cable 17A, and acts as the terminating terminals for voice signals received via orderwire cable 17B and supplied as orderwire voice outputs signals to the terminal attendant's headset. Terminal station 12 acts in a like manner with respect to its end of the network. The terminal stations are further provided with "paging" speakers 10P and 12P for enabling maintenance personnel to monitor the orderwire voice communications. Repeater stations 11 - 1 to 11 - N contain circuitry that will condition voice signals received over the orderwire cable sections 17A and 17B by amplification and equalization and then retransmit the signals out over the orderwire cable. Orderwire voice input and output links between each repeater and an associated audio circuit are provided as part of the bi-directional party line access to maintenance personnel at the repeaters.

In addition to providing the capability for maintenance voice communications, the orderwire system is used to transmit monitor and control messages in the form of digitally encoded amplitude modulated frequency tone signals. These messages, which are transmitted on a command/response format from a terminal station, permit network monitor and control equipment in the terminal stations to monitor conditions in the repeater, i.e., check for faults or defects that may occur. In a terrestrial communication network, the repeater units are usually self-contained, isolated pieces of hardware, typically buried or submerged, and are subjected to local environmental conditions. Continual monitoring of prescribed conditions within the repeaters, conditions such as temperature, humidity, pressure, entry, etc., through the orderwire subsystem provides maintenance personnel with an indication of the condition and integrity of the equipment along the network.

As will be explained below, a processor-based monitor and control subsystem is associated with each terminal station. When performing parameter monitoring and control functions, the control subsystem at terminal station 10 inputs digital command data as an orderwire message into orderwire (OW) communication equipment in the terminal station as OW data-in. This data is encoded as an amplitude modulated tone, normally on, using a single tone carrier at a first frequency $f_1$ and is transmitted over a west-to-east cable link 17A with each of repeater stations 11 - 1 to 11 - N examining the command word for that repeater station's unique address.

The command message is also received by terminal station 12 wherein it may be decoded and coupled to its associated control unit as OW data-out. The addressed repeater station decodes the message from terminal station 10 and formats a response message which is encoded and transmitted at either the first frequency $f_1$ or at a second frequency $f_2$ (depending upon the embodiment of the invention used) over west-to-east link 17A to terminal station 12 and over east-to-west cable link 17B to terminal station 10 on frequency $f_1$ or frequency $f_2$ (again, depending upon which embodiment of the invention is employed). At both terminal stations 10 and 12, the response message from the interrogated repeater is decoded and coupled to its associated monitor and control equipment as data-out for processing. In a similar manner, in response to a command message from its associated monitor and control equipment over the OW data input, terminal station 12 encodes and transmits a message at frequency $f_2$ over east-to-west cable link 17B. The subsequent response and decode operations proceed in the same manner as for command messages from terminal 10.

ORDERWIRE EQUIPMENT FOR TERMINAL STATION

The orderwire equipment for each terminal station is comprised of an orderwire interface transceiver module that interfaces with operational response devices in the station and monitor and control equipment. The monitor and control equipment may take the form of a processor based supervisory subsystem designed and programmed to carry out specific supervisory tasks related to the operation and condition of the various pieces of equipment of which the network is configured. As an understanding of the particular details of such a supervisory subsystem is not required for implementing the present invention, they will not be described here. For an illustration of one example of such a computer-based subsystem, however, attention may be directed to the description of the auxiliary terminal unit portion of the communications network described in the above-referenced application. Still, it is sufficient for purposes of the present description that it be realized that some form of monitor and control equipment is provided at the terminal station for the purpose of conducting supervisory functions attendant to the operation of the data transmission portion of the network (not shown), and that such equipment be capable of generating and accepting messages in a suitable digitally encoded format. In the description to follow reference will be made to the equipment for terminal station 10 for purposes of explaining an exemplary configuration. It should be understood however that the description applies also to terminal station 12 with due consideration given to change in frequencies and direction of communication.

ORDERWIRE INTERFACE TRANSCEIVER MODULE

The orderwire interface transceiver modules includes: 1—an orderwire signal interface unit that is comprised essentially of an analog section, and 2—an associated control unit containing digital encode/decode control logic, data multiplexing circuitry, parameter monitoring, and operational control device components. The configuration and operation of these units in accordance with the first embodiment of the invention will be described in detail below in conjunction with the description of FIGS. 2 and 3.

TERMINAL SIGNAL INTERFACE UNIT (FIG. 2)

As was explained briefly above, the signal interface unit operates to detect incoming amplitude modulated tone messages from another station and to forward these on to the associated control unit for processing and response. It also serves to transmit outgoing tone messages for delivery over the interstitial pair to another station. A further function of the signal interface unit is to couple voice messages between local audio communication circuits and the orderwire cable, with both voice and amplitude modulated tone messages being capable of being transmitted and interfaced simultaneously.

Figure 2:
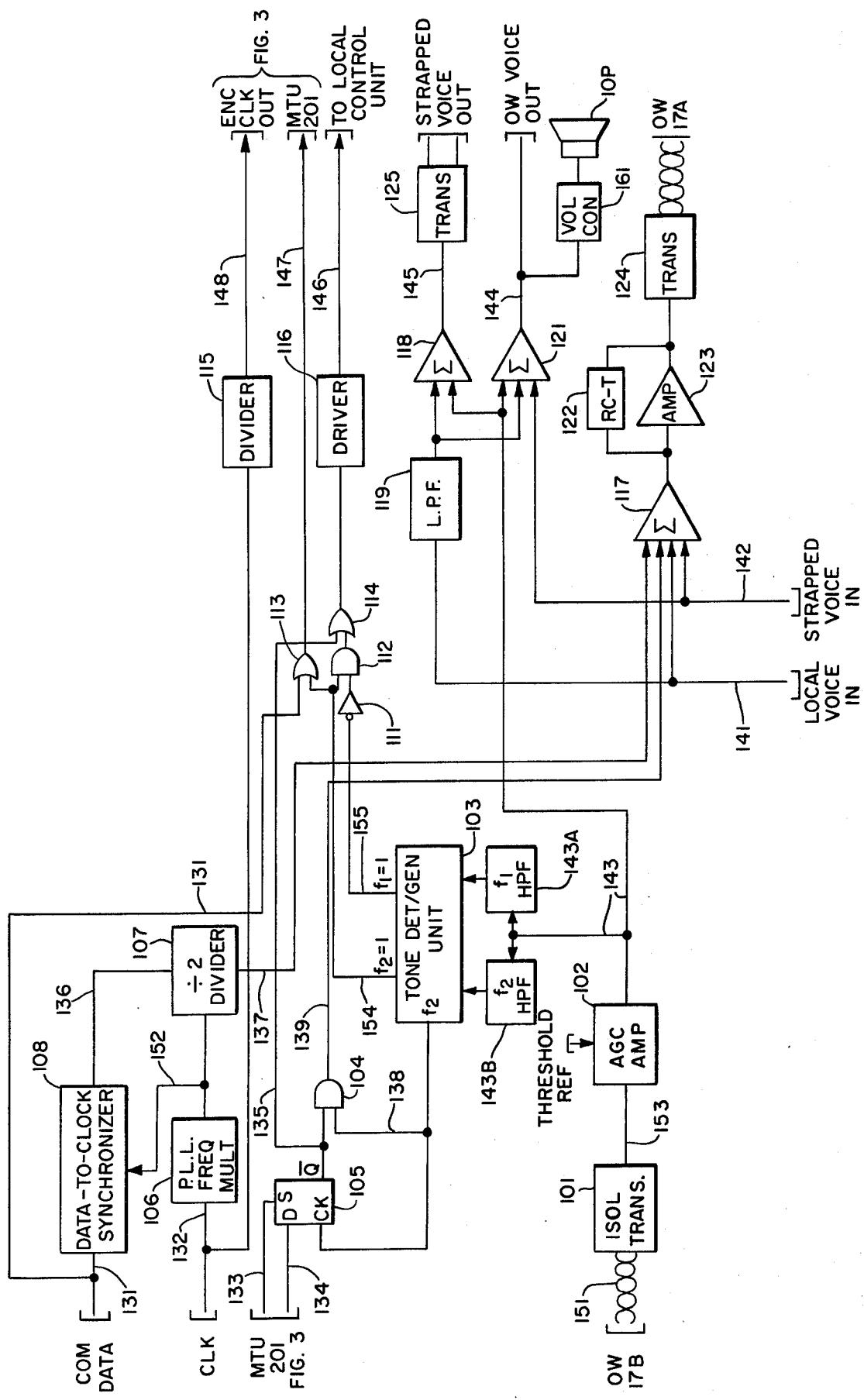
FIG. 2 is a schematic block diagram of a signal interface unit portion of an orderwire interface transceiver module for a terminal station in accordance with a first embodiment of the invention.

Referring now to FIG. 2, which is a schematic diagram of a signal interface unit for the first embodiment of the invention, wherein each orderwire link conveys both frequencies $f_1$ and $f_2$, at terminal station 10, a twisted pair 151 from the east-to-west local orderwire cable (corresponding to east-to-west cable 17B in FIG. 1) is terminated in an isolation transformer 101 and an associated AGC amplifier 102 is coupled to the output 153 of transformer 101. AGC amplifier 102 may contain a voltage controlled resistor (e.g., an FET) coupled in the feedback path of the AGC amplifier with the output being compared to a reference for gain control. AGC amplifier 102 controls the level of the received signal and offsets the attenuation of the orderwire cable 151 between terminal 10 and repeater 11 - 1. The output of AGC amplifier 102 is coupled over line 143 to a pair of high pass filters 143A and 143B, respectively, tuned to frequencies $f_1$ and $f_2$. The outputs of filters 143A and 143B are coupled to the tone response or detection inputs of a suitable commercially available dual tone detector/generator unit 103. Line 143 is also coupled to summing amplifiers 118 and 121. Tone detector/generator unit 103 responds to the presence of amplitude modulated tone commands from remote station 12 and to any response message it receives from an addressed repeater on orderwire cable 17B and outputs the recovered demodulated data via lines 154 and 155. In addition, dual tone detector/generator unit 103 generates a carrier tone on line 138 to be used in its own generation of a response message in reply to a command message from terminal station 12 or terminal 10. In the present example, considering the environment of terminal station 10, dual tone detector/generator unit 103 generates a carrier tone at frequency $f_2$ on line 138. In terminal station 12, the tone frequency on its line 138 is frequency $f_1$. This carrier frequency on line 138 is used to clock flip-flop 105 and enable AND gate 104. The SET input of flip-flop 105 is coupled to line 133 from the control unit (FIG. 3) to be described below. This line is used to keep the $\overline{Q}$ output of flip-flop 105 low and thereby prevent carrier $f_2$ transmission, except during the encoding and transmission of a response message, as will be explained below with reference to FIG. 3. Tone detector/generator unit 103 has a digital "$f_1$ detected" output coupled to lead 155 which has a one/zero level corresponding to the amplitude modulated tone of a digital response message on frequency $f_1$ from an addressed repeater. Similarly, the "$f_2$ detected" output is coupled to lead 154 and produces a zero/one level corresponding to the amplitude modulated tone encoded command message at frequency $f_2$ from terminal station 12. Lead 154 is coupled to one input of each of OR gates 112 and 113, while lead 155 is coupled through inverter 112 to another input of OR gate 112. The output of OR gate 112 is coupled to one input of OR gate 114, the output of which is coupled to a driver 116. The output of driver 116 is coupled to the local monitor and control unit associated with the terminal station. As was mentioned previously, in the present embodiment, each repeater station transmits a response message in reply to a command message on both carrier frequencies $f_1$ and $f_2$ over respective orderwire cables 17B and 17A. At terminal station 10, accordingly, any reply message, either from a repeater station (whether the repeater station be addressed by terminal station 10 or terminal station 12) or from terminal station 12, is received at "frequency $f_1$ detected" line 155 and coupled out via inverter 111 and OR gates 112 and 114 to the local monitor and control unit.

OR gate 114 has a second input coupled via line 131 to receive digital command data from the monitor and control unit associated with terminal station 10. Line 131 is further coupled to data clock synchronizer 108 the output of which is coupled over line 136 to a divide-by-two divider 107. A suitable clock signal is coupled over line 132 to a phase locked loop/frequency multiplier 106 and to a divider 115. Depending upon the transmission carrier frequency assigned to the terminal station of interest, frequency multiplier 106 will multiply the clock frequency on line 132 by either a value of two or three in order to establish a unique transmission frequency for that particular terminal station. For purpose of providing an illustrative example, frequency $f_1$ may be assigned a value of 20.48 KHz and frequency $f_2$ a value of 30.72 KHz so that the two frequencies have a ratio $f_2: f_1$ of 3: 2. The choice of this ratio makes it convenient to implement tone carrier detection and generation within the signal interface unit of each terminal station. Terminal station 10 is assigned a carrier frequency $f_1$ for transmitting command messages on cable 17A and receiving response messages on cable 17B. (Terminal station 12, on the other hand, is assigned a carrier frequency $f_2$ for transmitting command messages on cable 17B and receiving response messages on cable 17A.) Carrier frequency $f_1$ is on the order of 20 KHz ($f_1 = 20.48$ KHz) corresponding to the clock frequency on line 132 and the output of multiplier on line 152 is on the order of 40 KHz (40.96 KHz). This clock frequency is used for synchronizing phase lock loop 108 and is divided by divider 107 back to frequency $f_1$. The output 137 of divider 117 is coupled to one input of summing amplifier 117. Data/clock synchronizer 108 synchronizes the input command data from the monitor and control unit with the tone frequency $f_1$ so that an amplitude modulated tone message is applied over line 137 to summing amplifier 117 for transmission out on cable 17A.

Figure 3:
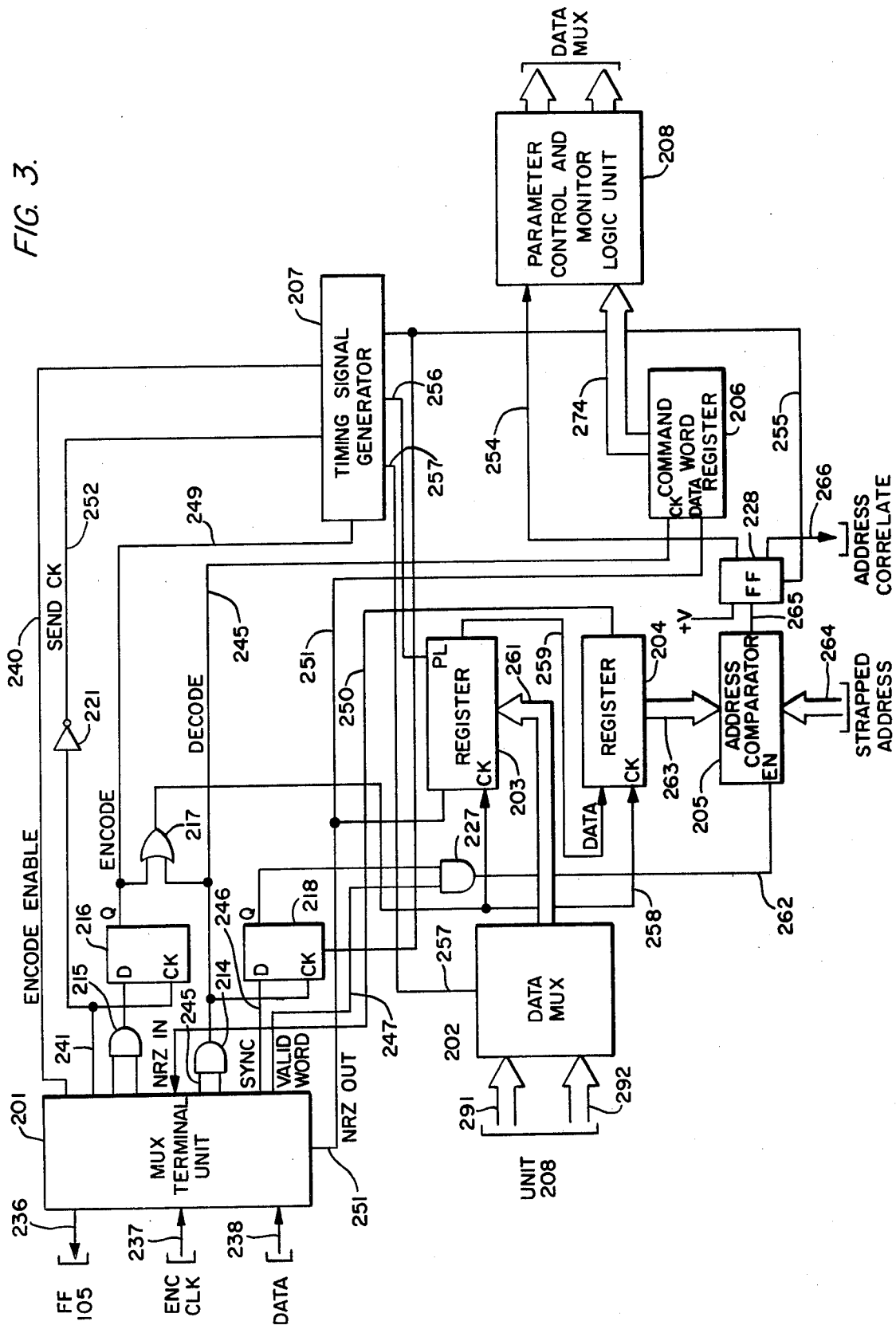
FIG. 3 is a schematic block diagram of an encode/decode control unit portion of an orderwire interface transceiver module.

Lines 133 and 134 are coupled to the control unit of the orderwire transceiver module (FIG. 3). Line 134 couples the local response message from the multiplex terminal unit 201 on line 236 (FIG. 2) to flip-flop 105 which is clocked by frequency $f_2$ (30.72 KHz) from tone detector unit 103. As a result, this local response message is synchronized with frequency $f_2$ and it enables and clears the $f_2$ carrier creating the local amplitude modulated response words that are clocked out from the $\overline{Q}$ output of flip-flop 105 through AND gate 104 to line 139, to be superimposed with the local command message by summing amplifier 117.

Line 133 supplies an "address correlate" signal from an address comparator within the control unit (FIG. 3) on line 266 which is used to keep the $\overline{Q}$ output of flip-flop 105 low except during the transmission of a response message in reply to an incoming message directed to terminal station 10, there otherwise being no response from the station to a message not directed to it. The $\overline{Q}$ output of flip-flop 105 is further coupled to OR gate 114, the output of which is coupled through a deglitch/differential driver 116 (e.g., a flip-flop) and over line 146 to the monitor and control unit, whereby the monitor control unit receives the local response from MTU 201 (FIG. 3), the incoming digital command message at frequency $f_2$ from terminal station 12 and any repeater response message at frequency $f_1$. Divider 115 divides the 20 KHz frequency on clock line 132 down to 10 KHz and applies the clock over line 148 as a timing signal for MTU 201 (FIG. 3) to be used by MTU 201 in encoding ON/OFF keyed messages.

Voice signals are coupled to the signal interface unit via links 141 and 142. Link 141 is derived from a standard twisted pair and is coupled throught low pass filter 119 to one input of a summing amplifier 118. The local voice signals on link 141 are derived from audio input equipment such as a headset used by maintenance personnel. Link 142, which couples "strapped" voice from any auxiliary audio equipment, such as another local orderwire unit, recording equipment, etc., is derived from a transformer isolated twisted pair and is coupled to each of summing amplifiers 118 and 121. Each of summing amplifiers 118 and 121 is further coupled to receive, via line 143, the incoming tone signals from the local orderwire cable 151. The output of summing amplifier 118 is coupled via line 145 and transformer 125 to "strapped" voice out local orderwire terminals which may be coupled to auxiliary audio equipment as mentioned above. The summed voice and tone outputs from amplifier 121 are applied to line 144 as local orderwire voice output which may be coupled over a twisted pair to an attendant's headset, and via volume control unit 161 to a terminal station paging loudspeaker 10P.

OPERATION

INCOMING DIGITAL MESSAGES

As was described briefly above, for detecting an incoming amplitude modulated tone message from a remote station, a dual tone detector/generator 103 is provided. If the message is a response message, as from one of the repeater stations, it will be modulated on tone carrier $f_1$. If it is a command message from the other terminal station 12 it will be modulated on tone carrier $f_2$. In either case, the incoming tone signal on east-to-west interstitial pair 17B is coupled through isolation transformer 101, AGC amplifier 102 and one of high pass filters 143A and 143B to dual tone detector/generator 103. Tone detector/generator 103 responds to the ON/OFF keying of the passed-through tone and supplies digital transition signal train corresponding to the amplitude modulation of the received tone over one of lines 154 and 155. If the message is a response message, whether it be from a repeater station or from terminal station 12, it will be modulated on the carrier associated with terminal station 10, i.e. frequency $f_1$, and coupled over line 155, to be delivered to the monitor and control unit from the output of driver 116. On the other hand, if the message is a command message from the remote terminal station 12 it will be carried on tone frequency $f_2$ and decoded on line 154 from tone detector/generator unit 103. This message is coupled to both the monitor and control unit via OR gate 112 and to the control unit of the orderwire transceive module via OR gate 113 and line 141 for a response.

INCOMING VOICE SIGNALS

Incoming voice signals coupled from the orderwire cable 151 through isolation transformer 101 and AGC amplifier 102 are coupled over line 143 to a pair of summing amplifiers 118 and 112 to be delivered to associated output voice circuits, (e.g. maintenance personnel's headset, a "strapped" recorder, paging speaker, etc.,) as provided, via lines 144 and 145.

OUTGOING DIGITAL MESSAGES

The transmission of outgoing messages from the orderwire interface transceiver module may be governed either by the monitor and control unit at the terminal station (for outgoing command messages) or in response to a command message from the remote terminal (for an outgoing response message). In the former instance, the command message to be transmitted (here, considering terminal station 10, the message is amplitude modulated via tone carrier $f_1$ on to the west-to-east orderwire cable 17A) is coupled from the monitor and control unit over line 131 to data/clock synchronizer 108 and OR gate 113. The connection to OR gate 113 enables the monitor and control unit at terminal station 10 to address the operational devices of interest in terminal station 10 proper, since the west-to-east orderwire cable 17A does not connect to receiving equipment in terminal station 10 itself. In this way the monitor and control equipment in each terminal station is capable of conducting supervisory operations with respect to equipment at all the sites of the network including itself. In the present example it will be assumed that the monitor and control unit at terminal station 10 is transmitting a message to another site (i.e. a repeater station or terminal station 12). As will be explained in greater detail below in connection with the description of FIG. 3, each message contains an address segment that identifies the site for whom the message is intended. Thus, although each station is coupled to receive any message on the orderwire, unless it recognizes its own address, it ignores the message. Because of this feature, even though an outgoing message on line 131 is applied via OR gate 113 to line 147, within the control unit (FIG. 3) the message will be ignored since the address portion of the message indicates an address other than its own (i.e. another site).

Considering the transmission of a message from the monitor and control unit at terminal station 10 to a remote site, the digitally encoded command message is coupled over line 131 to data/clock synchronizer 108. Synchronizer 108 is clocked by the output of frequency multiplier 106 which doubles the 20.49 KHz clock on line 132 to 40.96 KHz. The digital signal on line 136, representing the synchronized message, is used to control the ÷2 divider 107 to output no signal or divide by 2 the 40.96 KHz input from phase locked loop frequency multiplier 106. The 20.48 KHz amplitude modulated signal is coupled over line 137 to summing amplifier 117 for application to the west-to-east interstitial pair 17A via amplifier 123 and isolation transformer 124. (It is to be noted here that for terminal station 12, whose carrier frequency $f_2$ is 30.72 KHz, frequency multiplier 106 multiplies the 20.48 KHz on line 132 by three so that at the output of divide-by-two divider there is produced a 30.72 KHz tone.)

The second type of outgoing message that may be transmitted from the terminal station is a response message in reply to a command message from the terminal station at the local or remote end of the orderwire cable. In this case, the contents of the response message are generated in the control unit (FIG. 3) of the orderwire transceiver module and supplied over line 134 to flip-flop 105. Since the response message is to be transmitted to terminal station 12, it is transmitted on the carrier associated with terminal station 12, namely, tone frequency $f_2$, which is generated by tone detector/generator 103 on line 138. This carrier is applied to the clock input of flip-flop 105 and AND gate 104 to provide a clean modulated carrier $f_2$ output from the output of AND gate 104 to be coupled over line 139 to summing amplifier 17 and on to west-to-east orderwire cable link 17A. The output of flip-flop 105 is also coupled via line 135 and OR gate 114 to the monitor and control unit associated with terminal station 10 so that its own control facility is advised of the contents of the response message.

OUTGOING VOICE SIGNALS

Outgoing voice signals such as local voice signals from an attendant's headset and "strapped" voice signals are coupled over input lines 141 and 142 to summing amplifier 117 for delivery to the orderwire cable. These signals are also coupled to local audio equipment via summing amplifier 118 and 121 so that, in effect, all voice signals conveyed over the orderwire cable are made available according to a party line format.

CONTROL UNIT (FIG. 3)

As described above in conjunction with the description of FIG. 2, the signal interface unit of the orderwire interface transceiver module is coupled to a control unit containing digital encoding/decoding circuitry. Advantageously, the control unit, a schematic block diagram of which is illustrated in FIG. 3, is of a modular field-programmable configuration so that it may be readily incorporated in different portions of the orderwire system. In particular, as will be described in more detail below, the same modular control unit incorporated in the orderwire interface transceiver module of a terminal station can also be used for the control unit of the orderwire control module (to be described below) that forms the essential part of the supervisory section of a repeater station. The decoding and encoding functions are performed by a multiplex terminal unit 201 which decodes incoming Manchester encoded data into NRZ format and encodes NRZ data into Manchester encoded data. Multiplex Terminal Unit (MTU) 201 may be comprised of a commerically available HARRIS HDI-15530 Manchester to NRZ encoder/decoder having the data and control port interconnections described below. Line 236 of MTU 201 is the Manchester signal output line which is coupled to line 134 of the signal interface unit shown in FIG. 2. Line 237 couples the divided-down encoding clock over line 148 from divider 115 (FIG. 2), while line 238 is coupled to line 147 to couple the output of OR gate 113 (FIG. 2) to the data input of MTU 201. The derived NRZ data decoded by MTU 201 is coupled over line 251 to the serial data input of an eight-bit serial/parallel-in, serial-out register 203 and to the serial data input of a serial-in, parallel-out command word register 206. Register 203 operates in conjunction with a serial-in, parallel-out register 204 to store a respective portion of a command message received from a remote source or a response message generated at the present station. The manner in which registers 203 and 204 store and output these messages will be explained below in conjunction with the description of the operation of the module with reference to FIGS. 4 and 5. Command word register 206 stores the byte of an incoming command message which governs operation monitoring and control functions as will be described below.

Line 241 couples a transmit clock generated by MTU 201 to the clock input of flip-flop 216 and, via inverter 221, to a timing signal generator 207. Timing signal generator is comprised of combinational logic that may include a suitably programmed PROM to generate the timing and control signals to be described below. Rather than describe the details of an implementation of generator 207, the explanation to follow will treat the input and output signals that are associated with timing signal generator 207 and their functions relative to the other components of the system, in order not to burden the present description with details that will be readily understood and implemented by one skilled in the art.

Line 240 couples an encode enable signal from timing signal generator 207 to the ENCODE ENABLE input of MTU 201, while line 242 supplies a SEND DATA ENABLE signal from MTU 201 to AND gate 215. Line 250 couples NRZ data derived from serial-in, serial-out register 204 to the NRZ input of MTU 201. Line 246 supplies an enable signal to flip-flop 218 upon MTU 201 detecting a sync pattern in an incoming message, while line 247 couples an enable signal to one input of AND gate 227 when MTU 201 detects a valid message word applied over line 238 from the signal interface unit.

The output of AND gate 215 is coupled to the D input of flip-flop 216, the Q output of which is coupled to one input of OR gate 217 and to the clock/shift inputs of register 203 and 204. The output of AND gate 214 is coupled to the other input of OR gate 217, to the clock input of flip-flop 218 and to the clock input of command word register 206. The Q output of flip-flop 218 is coupled to a second input of AND gate 227 the output of which is coupled to the enable input of an address comparator 205. Address comparator 205 is coupled to the various stages of register 204 via link 263 and to a strapped address code identifying the station (here terminal station 10) coupled over link 264. When enabled via line 262, address comparator 205 compares the contents of register 204 with an address byte supplied over line 264 (here the address of terminal station 10). Should the two bytes match, the state of output line 205 changes logic levels thereby clocking flip-flop 228.

The Q output of flip-flop 228 is coupled over line 254 to timing signal generator 207 and to parameter control and monitor logic unit 208. Parameter control and monitor logic unit 208 responds to the instructions in the incoming command messages by conducting either operational actions such as engaging or disengaging particular devices, reading parameter data, etc. in the site being addressed. Neither the particular type of activity carried out nor the circuits for implementing the same are significant with respect to an understanding of the present invention and, accordingly, will not be described. As was pointed out previously, the present invention relates to the communication scheme and not to the meaning or impact of the signals being transmitted. For purposes of the present description it may be understood that parameter monitor and control unit 208 contains appropriate combinational logic components for responding to the command data and providing response data where required. Still, for a specific example of the configuration of such a parameter control and monitor unit as may be employed for carrying out prescribed tests and measurements in a fiber optic communication system attention may be directed to the above-referenced application.

Line 254 is used to initiate a decode/encode timing cycle that governs the operation of the control unit. The $\overline{Q}$ output of flip-flop 228 is coupled over line 266 to line 133 and the set input of flip-flop 205 of the signal interface unit (FIG. 2). As was pointed out above, the control line 133 to the set input of flip-flop 105 in the signal interface unit (FIG. 2) is used to keep its $\overline{Q}$ output low and thereby inhibit the transmission of the $f_2$ carrier except when a response message is to be transmitted. Since a response message requires the receipt and acceptance of a command message by the module, the output of address comparator 205 is used to control this inhibiting function. Normally, in the absence of a clock signal from address comparator 205 the state of flip-flop 228 is such that its $\overline{Q}$ output is high, thereby coupling a high level over line 266 to line 133 and the direct set input of flip-flop 105. Only when a command message has been captured by the control unit, with address comparator 205 clocking flip-flop 228, does the $\overline{Q}$ output of flip-flop 228 go low removing the direct set input to flip-flop 105 in the signal interface unit (FIG. 2). Flip-flop 228 and flip-flop 218 are cleared at the end of the decode/encode sequence by a signal from timing signal generator 207 on line 255.

Parameter data to be monitored is applied from devices coupled to unit 208 to a data multiplexer 202 over a set of parallel input data links 291 and 292. The size of each link will depend upon the number of bits employed to represent the parameter data and for purposes of the present description each link may assume to be one byte in length. While two one byte links 291 and 292 are shown, it is to be understood that more or less than the number illustrated may be used to couple the parameter data to the control unit, with the switching of multiplexer 202 controlled as necessary to accommodate the data input size employed. Line 257 is coupled to receive a switching signal from timing signal generator 207 for coupling either link 291 or link 292 to output link 261 and the parallel inputs of register 203. The byte on link 261 is loaded into register 203 by a parallel load signal applied over line 256 for timing signal generator 207 during the encode operation. The serial output of register 203 is coupled over line 259 to the data input of register 204. As mentioned briefly above, registers 203 and 204 together form the input/output registers for data decoding and encoding.

As was pointed out earlier, the NRZ output of MTU 201 is coupled over line 251 to the data input of serial-in, parallel-out register 206. Register 206 is used as a command word storage register to store the command instruction bits of a decoded command message that has been accepted by the station. As will be explained in more detail below with reference to FIGS. 4 and 5 in conjunction with the description of the operation of the module, the command instruction bits comprise the second byte of the command word and it is these bits that control the action to be taken by the parameter control and monitor unit 208. For this purpose, the command byte contains an eight bit select field the contents of which contain an instruction for causing unit 208 to take some particular action, such as device switching, parameter reporting, etc. The format of this byte may be tailored to the needs of the user and operation of parameter control and monitor unit 208 and will not be described here.

OPERATION

COMMAND MESSAGE DECODING

Figure 4:
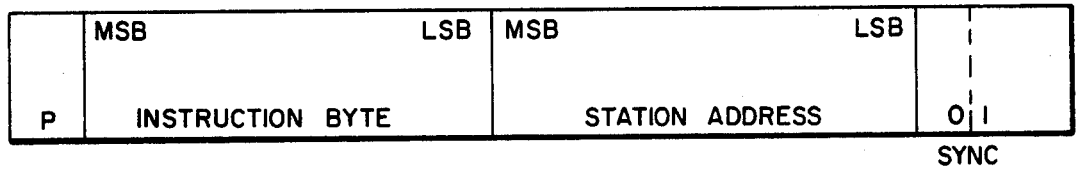
FIG. 4 and 5 respectively illustrate the data format of a command message and a response message transmitted over the orderwire communication system.

As was described briefly above, the format of a command message is a twenty bit configuration as shown in FIG. 4. For purposes of the present description it will be assumed that a command message incoming on the orderwire from terminal station 12 has been interfaced by the orderwire signal interface unit (FIG. 2) with a terminal 10 station address code. The received command message is conveyed over line 147 from the signal interface unit and applied to input line 238 of MTU 201. When MTU 201 detects a command sync pattern in the first three bits of the message (see FIG. 4), it enables AND gate 214 and changes the state of line 246 to flip-flop 218. Decode shift clock pulses on line 244 are now coupled through AND gate 214 to flip-flop 218. As a result, the NRZ (decoded Manchester) data (command bytes one and two) is clocked out of MTU 201 and into the serial combinations of registers 203 and 204 and into command word register 206. (Note that only the second byte of the command word is held by register 206 as the first byte is deleted during clocking in of the second byte). Upon detecting a valid command word (valid sync, data and parity bits) MTU 201 causes line 247 to go high enabling AND gate 227, which thereby applies an enabling signal over line 262 to address comparator 205. Address comparator 205 compares the strapped address code on link 264 to the address byte (station address, see FIG. 4) that has been clocked into register 204. Since it has been assumed that terminal station 10 has been addressed, the two codes match and address comparator produces an output on line 265, thereby setting flip-flop 228. Had there been an error in the command word, MTU 201 would not have enabled AND gate 227 thereby inhibiting the address comparison operation and would have continued to monitor data input line 238 for another command word. Similarly, should there be no address code correlation, comparator 205 does not set flip-flop 228.

When address comparator 205 sets flip-flop 228, line 254 changes state thereby informing parameter control and monitor unit 208 that it may proceed to decode and respond to the contents of the instruction byte stored in command word register 206. As mentioned above this may entail the performance of a specific function with respect to the components of the station or the reporting of parameter data to be delivered back to the source of the command message there terminal station 12. In the latter case the response data is coupled over links 191 and 192 to multiplexer 202.

RESPONSE MESSAGE ENCODING

Figure 5:
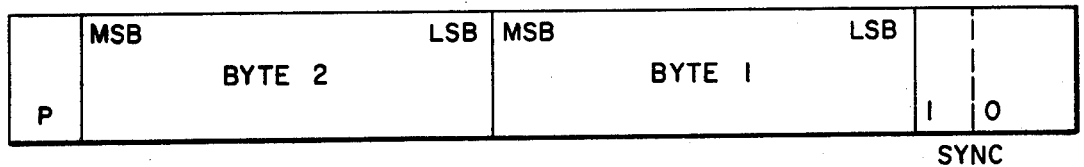

When MTU 201 is ready to encode the response message (consisting of three successive response words, as shown in FIG. 5) to be sent back to terminal station 12 it enables AND gate 215 via line 242 and begins applying encoding shift clock pulses over line 239 to the other input of AND gate 215. A transmission clock signal (SEND CLOCK) is applied over line 241 to the clock input of flip-flop 210 and, via inverter 221 and line 252 to timing signal generator 207. The Q output of flip-flop 216 applies an ENCODE action signal over line 249 to timing signal generator 207 and, via OR gate 217, a shift clock signal via line 258 to registers 203 and 204. As a result, the first and second bytes of the first response word (the command echo) are clocked out of register 203 and 204 over line 250 to the NRZ input of MTU 201, which encodes the NRZ formatted command echo into Manchester signals, adds the sync and parity bits and transmits the first response word over line 236 to line 134 of the signal interface unit (FIG. 2) described previously.

Assembly of the second response word is controlled by a multiplex control signal on line 257 and a parallel data load signal on line 256 from timing signal generator 207. For the second response word the multiplex control signal on line 257 causes data bits applied via link 291 to be coupled over link 261 to the parallel inputs of the respective stages of register 203. These data bits are loaded into register 203 by a parallel-load control signal on line 256 and then clocked serially through registers 203 and 204 to the NRZ input of MTU 201 for encoding and transmission out over line 236. Subsequently, the third response word is assembled, with the multiplex control signal on line 257 causing the bits of link 292 to be coupled to link 261 for parallel loading into register 203. With these bits loaded into register 203, the third response word is clocked out of registers 203 and 204 for encoding by MTU 201 and transmission over line 236.

Upon the completion of the encoding of the third response word, timing signal generator 207 removes the ENCODE ENABLE signal from line 240 and resets flip-flops 218 and 228 via line 255 so as to prepare the orderwire interface transceive module to receive a new command message.

ORDERWIRE EQUIPMENT FOR REPEATER STATION

The orderwire equipment for each repeater station is similar to that employed in a terminal station, each repeater station including its own orderwire interface transceiver module. As in a terminal station, the orderwire interface transceiver module of a repeater site includes an essentially analog signal interface unit and a digital control unit. Since the latter is identical to that employed in the orderwire interface transceiver module of a terminal station described above with reference to FIG. 3, the following description will focus upon the configuration and operation of the signal interface unit for the first embodiment of the invention, shown in FIG. 6.

SIGNAL INTERFACE UNIT FOR REPEATER STATION (FIG. 6)

Figure 6:
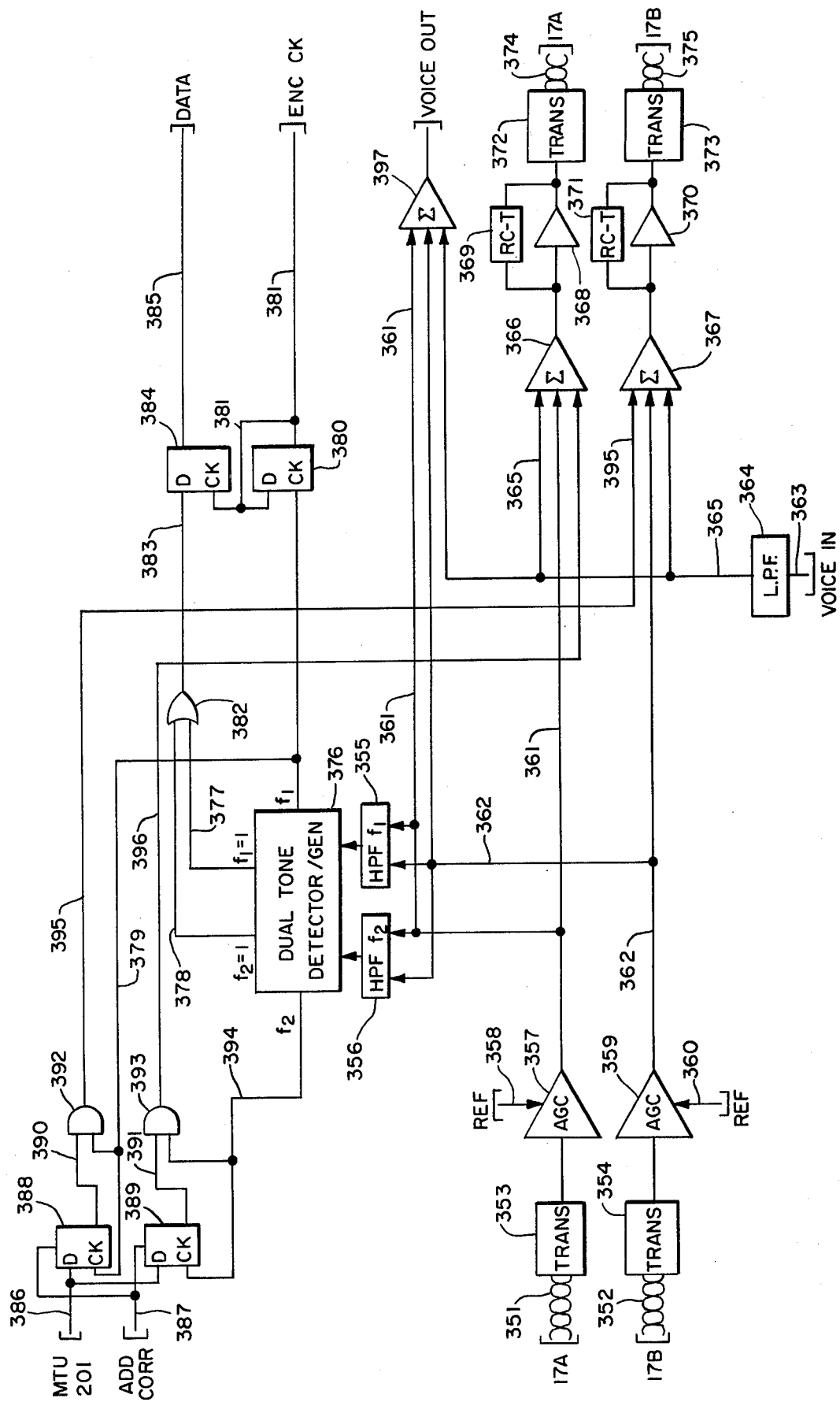
FIG. 6 is a schematic block diagram of a signal interface unit portion of an orderwire interface transceiver module for a repeater station in the first embodiment of the invention.

Referring now to FIG. 6 the signal interface unit for a repeater station of the first embodiment of the invention is depicted as comprising a pair of orderwire cable input links 351 and 352 and output links 374 and 375, each formed of a twisted pair orderwire cable for cable links 17A and 17B, respectively. As was pointed out previously, cable link 17A corresponds to communications directed from west-to-east along the orderwire, while cable 17B corresponds to communications directed from east-to-west. Whereas, a terminal station is located at one end of the orderwire cable and therefore sources communications in one direction and receives communications in the other direction, a repeater station is configured to convey communications in both directions so that it must be capable of receiving and transmitting communications over each of cables 17A and 17B. Each incoming twisted pair 351 and 352 is coupled to a respective isolation transformer 353, 354. The output of each respective transformer is coupled through AGC amplifiers 357 and 359 to lines 361 and 362. Line 361 is coupled to an input of each of summing amplifiers 397 and 366 and to each high pass filters 355 and 356. Similarly, line 362 is coupled to each of summing amplifiers 397 and 367 and to high pass filters 355 and 356. High pass filters 355 and 356 have their outputs coupled to respective detection input of dual tone detector generator unit 376. High pass filter 355 is tuned to pass only signals at frequencies equal or above $f_1$, while filter 356 is tuned to pass only signals at frequencies equal or above $f_2$. The $f_1$ carrier output of unit 376 is coupled over line 379 to the clock input of flip-flop 388, and one input of AND gate 392. Through line 379, a local clock phase locked to the terminal source tone $f_1$ ($f_1 = 20.48$ KHz) is provided for each repeater, so that all repeaters are synchronized at precisely the same frequency. The $f_2$ carrier output of unit 376 is coupled over line 394 to the clock input of flip flop 389 and to one input of AND gate 393. Dual tone detector/generator unit 376 further outputs decoded digital data transmitted via carriers $f_1$ and $f_2$ over lines 377 and 378, respectively, to the two inputs of OR gate 382 and generates carrier tones $f_1$ and $f_2$ on line 379 and 394, respectively, as explained above. The output of OR gate 382 is coupled over line 383 to the D input of flip-flop 384, the Q output of which is coupled over line 385 to the data input line of the MTU in the associated control unit of the repeater's orderwire interface transceiver module. Flip-flop 384 is clocked by the Q output of flip-flop 380 which functions as an edge refining driver the output of which is coupled over line 381 to the MTU of the control unit of the module.

Encoded response messages from the associated MTU of the control unit are coupled over line 386 to the D inputs of flip-flops 388 and 389. An address correlation signal from the control unit is coupled to the direct SET inputs of each of flip-flops 388 and 389 to inhibit the transmission of either carrier tone except in the event of the generation of a response message in reply to a command message that has been accepted by the control unit. As explained above in conjunction with the description of FIG. 3, flip-flop 228 in the control unit inhibits tone carrier generation by keeping the address correlation line 266 high except in those situations when a response message is to be encoded upon receipt of a command message. The $\overline{Q}$ outputs of flip-flops 388 and 389 are coupled over lines 390 and 391 to AND gates 392 and 393, and serve to synchronously amplitude modulate the response words from the MTU onto frequencies $f_1$ and $f_2$, respectively, as generated by the tone detector/generator unit 376, for application over lines 395 and 396 to summing amplifiers 367 and 366, for coupling to orderwire cables 17A and 17B, respectively.

Voice signals are applied via input line 363 through a low pass filter 364 and line 365 to each of summing amplifiers 366, 367 and 397. The output of summing amplifier 397 provides the voice output signals to associated repeater voice monitoring equipment such as a local headset. The outputs of summing amplifier 366 and 367 are coupled through equalization amplifiers 368 and 370 each configured with a feedback RC-T filter 369 and 371, respectively. The outputs of amplifiers 368 and 370 are coupled to the local orderwire twisted pair cables 374 and 375 via transformer units 372 and 373, respectively.

OPERATION

The operation of the signal interface unit of a repeater station is similar to that of a terminal station, except that the repeater station does not source or terminate a message. Voice signals are output directly to the local attendant's headset via summing amplifier 397. Any incoming voice from the local attendant and all incoming signals are further relayed out on cables 17A and 17B via summing amplifiers 366 and 367.

Incoming amplitude modulated tone digital messages on either orderwire cable 17A or orderwire cable 17B are passed by one of high pass filters 355 and 356 and then detected by tone detector unit 376 and the recovered binary digital data are conveyed over one of lines 377 and 378 to OR gate 382 for coupling to line 388 to the associated MTU for a possible response (depending upon whether the address byte of the command word identifies that particular repeater station).

For example, a command message from terminal station 10 and thereby keyed onto frequency $f_1$ on orderwire cable 17A will be coupled through high pass filter 355 from isolation transformer 353 and amplifier 357. Similarly, a command message from terminal station 12 and thereby keyed onto frequency $f_2$ on orderwire cable 17B will be coupled through highpass filter 356 from isolation transformer 354 and amplifier 359. As described above, each repeater is synchronized with the $f_1=20.48$ KHz tone, so that the encoding clock for the MTU is derived from the divided 20.48 KHz clock (frequency $f_1$) as described above with reference to FIG. 3. Thus, the clock is derived from the $f_1$ tone output in line 379, divider 380 and output line 381 to the MTU of the control unit.

If the repeater has been addressed by an incoming command message from one of terminal stations 10 and 12, the MTU of the associated digital section (see FIG. 3) will formulate a response and apply it over line 386 to be synchronously applied to orderwire cables 17A and 17B via the synchronous carrier clocking action of flip-flops 389 and 388 and AND gates 393 and 392, respectively. Since a repeater transmits its response message to each terminal station on separate tone carriers $f_1$ and $f_2$, each of flip-flops 388 and 389 and associated AND gates 392 and 393 are clocked and enabled respectively at the $f_1$ and $f_2$ tone frequencies, so that the incoming response digital signals on line 306 from the MTU of the control unit effectively modulate respective tones $f_1$ and $f_2$ for transmission to terminal stations 10 and 12 over orderwire cables 17B and 17A, respectively. The output of AND gate 392 containing the response message of frequency $f_1$ is coupled over line 395 to summing amplifier 367 for application to orderwire cable 17B. Similarly, the response message from AND gate 393 is coupled over line 386 to summing amplifier 366 for application to orderwire cable 17A.

The foregoing embodiment of the invention employs a pair of tones for each of the west-to-east and east-to-west links. In accordance with a second embodiment of the invention, to be described below, communication over each link may be conducted using a respective single tone assigned to each link irrespective of whether the message is a command message or a response message. In this second embodiment of the invention, messages conveyed over link 17A are amplitude modulated onto a first tone (e.g., $f_1=20.48$ KHz) while those sent over link 17B are amplitude modulated onto a second tone (e.g., $f_2=30.72$ KHz). As in the first embodiment, each terminal and repeater station contains an orderwire signal interface unit and an associated control unit. The control unit for each station is identical to that in the first embodiment, so that a description of the same will not be repeated. The signal interface units, however, although quite similar to those shown in FIGS. 2 and 6, contain additional signal switching control components which serve to enable normal signal detection and response functions and to provide a reply carrier source to the supervisory equipment at one of the terminal stations in the event of a fault or failure.

Further, in this embodiment, provision is made for amplitude modulation transmission at indices of modulation other than 100%. These units for a terminal station and a repeater station, respectively, will be described with reference to FIGS. 7 and 8.

Figure 7:
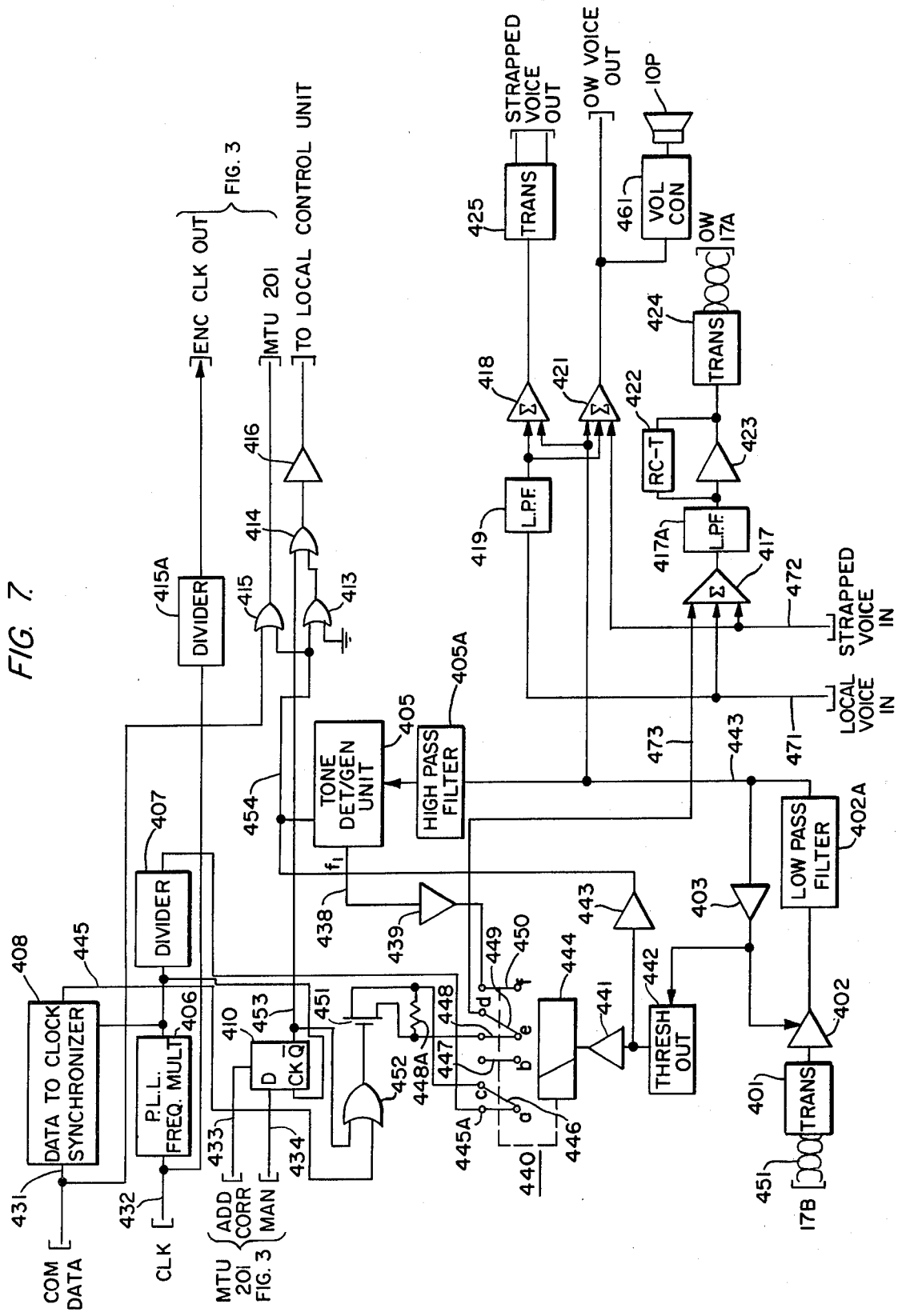
FIG. 7 is a schematic block diagram of a signal interface unit portion of an orderwire interface transceiver module for a terminal station in accordance with a second embodiment of the invention.

Terminal Signal Interface Unit (FIG. 7)

Like the terminal signal interface unit described with reference to FIG. 2, the unit shown in FIG. 7 operates to detect incoming amplitude modulated tone messages from another station and to forward these on to the associated control unit for processing and response. It also serves to transmit outgoing tone messages for delivery over the interstitial pair to another station. A further function of the signal interface unit is to couple voice messages between local audio communication circuits and the orderwire cable, with both voice and amplitude modulated tone messages being capable of being transmitted and interfaced simultaneously.

Referring now to FIG. 7, there is shown a schematic diagram of a terminal signal interface unit for the second embodiment of the invention wherein each orderwire link conveys messages using only one of carrier frequencies $f_1$ and $f_2$. Again, for purposes of the present description, it will be assumed that the terminal signal interface unit of interest is that employed at terminal station 10. East-to-west orderwire cable link 17B over which messages are amplitude modulated onto carrier frequency $f_2$ terminates via twisted pair 451 at isolation transformer 401. The output of transformer 401 is coupled to an associated AGC amplifier 402, the AGC control input of which, in turn, is coupled to the output of a feedback amplififer 403. AGC amplifier 402 may contain a voltage controlled resistor (e.g., an FET) coupled in its feedback control path with the output being compared to a reference for gain control. Amplifiers 402 and 403 control the level of the received signal and offset the attenuation of orderwire cable 451 between terminal station 10 and its adjacent repeater 11-1.

The output of amplifier 402 is coupled through a low pass filter 402A, over line 443, to a high pass filter 405A and tone detector/generator unit 405. Line 443 is also coupled to summing amplifiers 418 and 421. Tone detector/generator unit 405 responds to the presence of an amplitude modulated tone command from remote terminal station 12 and to any response message from an addressed repeater it receives an orderwire cable 17B and outputs the demodulated digital data modulation recovered from received frequency $f_2$ over line 454 to one input of each of OR gates 415 and 413. OR gate 415 has a second input coupled to line 431 to receive command message data from the local supervisory unit to be transmitted out over west-to-east orderwire cable 17A. The messages themselves are formatted by the encode/device control unit (FIG. 3) and the output of OR gate 415 is coupled to MTU 201 (FIG. 3) for this purpose. OR gate 413 is coupled to one input of OR gate 414 the output of which is coupled via buffer amplifier 416 to the local supervisory unit. A second input of OR gate 414 is coupled via line 453 to the $\overline{Q}$ output of flip-flop 410. Flip-flop 410 is employed to synchronously clock messages from the encode/device control unit for delivery to an intended recipient via outgoing switching circuitry (to be described below) and out over west-to-east orderwire cable 17A. As all outgoing messages from terminal station 10 are monitored by the local supervisory equipment, line 453 couples these messages to the supervising equipment via OR gate 414 and buffer amplifier 416, just as in the previously-described first embodiment.

Command message data on line 431, in addition to being coupled to one input of OR gate 415, as explained above, is coupled to a data-to-clock synchronizer 408 which synchronizes the command message data with the clock output of frequency multiplier 406. The synchronized output data is coupled over line 455 to OR gate 452 where it is combined with response data from MTU 201 (FIG. 3). The output of OR gate 452 is coupled to the gate of FET switch 451, the operation of which is to amplitude modulate the carrier tone, 20.48 KHz in the present unit of interest at terminal 10.

The clock source for all communications is derived from a line 432 which is coupled to receive a system clock of 20.48 KHz. This clock is coupled through a divider 415A for delivery to the encode/decode control unit (FIG. 3) and to a phase lock loop/frequency multiplier 406. Again, depending upon the transmission carrier frequency assigned to the terminal station of interest, frequency multiplier 406 will multiply the clock frequency on line 432 (20.48 KHz) by either a value of two or three in order to establish a unique transmission frequency for that particular terminal station. For terminal station 10, the clock output of frequency multiplier 406 is 40.96 KHz, while for terminal station 12, the clock output of the multiplier is 61.44 KHz. This clock is then divided by two in divider 407 to produce the carrier clock for outgoing messages which is connected by line 445A to terminal a of a double-pole, double-throw relay switch circuit 400. As will be described in detail below, the relay switch 400 normally steers command message data to line 473 so as to be coupled via summing amplifier 417, low pass filter 402A, equalizer 423 and transformer 424 to west-to-east orderwire cable link 17A. In the event of a fault or failure, causing loss of carrier on incoming east-to-west link 17B, relay circuit 440 is switched to supply an outgoing carrier $f_1$ onto the west-to-east link and to inhibit the reception or transmission of data by the terminal station.

For this purpose, the output of AGC feedback amplifier 403 is coupled to a threshold detector 442, the output of which is coupled to a relay driver 441 and buffer amplifier 443. Threshold detector 442 has its trigger reference set at a level approximating the output of amplifier 403 for maximum gain by AGC amplifier 402, so that for a loss of carrier on east-to-west orderwire cable 17B, which causes the gain imparted by amplifier 402 to go maximum, the output of threshold detector 442 will change state. When threshold detector 442 is triggered in response to loss of carrier, its output is coupled through driver 441 to energize relay coil 444 of relay circuit 440. The output of threshold detector 442 is also coupled through amplifier 443 to line 454 to latch or hold the detection output of unit 405 and thereby one input of each of gates 413 at a zero logic level, so that each of gates 413 and 415 will see no incoming message from orderwire cable 17B.

Tone detector/generator unit 405 provides a carrier frequency of $f_1 = 20.48$ KHz output over line 438 through amplifier 439 to lead 450 and terminal f of relay circuit 450. In the normally non-energized condition of relay circuit 400, terminal f is open. In response to a loss of carrier, however, with relay coil 444 being energized by the output of driver 441 movable contact arms 446 and 449 are switched between respective terminals a-c and e-d to terminals c-b and d-f. Terminal d is coupled to input line 473 of summing amplifier 417, while terminal e is coupled to the source of FET switch 451. The drain of FET switch 451 is coupled to terminal c, while terminal b is coupled to open line 447. The gate of FET switch 451 is coupled to the output of OR gate 452 one input of which is coupled over line 453 to the $\overline{Q}$ output of flip-flop 410. The other input of OR gate 452 comes from data synchronizer 408. Since the Q output of flip-flop 410 represents response data to be transmitted, and data synchronizers output on line 445 represents command data, FET switch 451 is turned on and off in accordance with response and command data, thereby controllably interrupting the flow of current between its source and drain in correspondence to the encoded data in line 434 from MTU 201 (FIG. 2) or command data on line 431. Further, a resistor 448A sets the index of modulation for transmission by providing a current path around FET switch 451. In the normally non-energized state of relay circuit 440, the source-to-drain current path of FET switch 451 is coupled to receive the carrier output of divider 407 via line 445A, terminal a, movable switch contact 446 and terminal c, so that the carrier ($f_1 = 20.48$ KHz) output of divider 407 is amplitude modulated in accordance with the output of flip-flop 410 and/or synchronizer 408. In response to a loss of carrier, however, with relay circuit 440 energized, the source-drain current path of FET switch 451 is disconnected from the output of divider 407, as movable switch contact 446 is switched to open terminal b. Since contact 449 is also switched to bridge terminals d and f, the carrier output on line 473 is provided via the $f_1 = 20.48$ KHz output line from tone detector/generator unit 405 and transmission of command or response data is inhibited.

The terminal interface unit of the second embodiment of the invention contains the same set of voice interface circuits as employed in the first embodiment. These components include low pass filter 419 coupling local voice input line 471 to summing amplifiers 418 and 421. The output of summing amplifier 418 is coupled to output transformer 425, while summing amplifier 421 supplies an orderwire voice output to an output line and to speaker 10 P via volumes control 461. The strapped voice input line 472 is coupled to each of summing amplifiers 417 and 421.

Under normal operating conditions, the operation of the terminal interface unit of FIG. 7 is similar to that of FIG. 2, except that only a single frequency is assigned to each orderwire link. Incoming messages on carrier $f_2$ from orderwire cable 17B are detected by tone detector 405, with the zero/one level changes, output on line 454 to MTU 201 and the local control unit. Messages assembled for transmission by MUT 201 or by the control unit via command data line 431 modulate the $f_1$ carrier output of divider 407 by the action of FET switch 451. In the event of loss of carrier, threshold detector 442 responds to a maximum gain output of AGC amplifier 402 to trigger relay switch 440, thereby connecting line 473 to the $f_1$ carrier output of unit 405, so as to supply an unmodulated f carrier tone to west-to-east orderwire cable 17A. When carrier returns, relay coil 444 is deenergized and normal conditions are restored, the carrier output of divider 407 (subject, of course, to amplitude modulation by FET switch 451) being coupled through normally-closed contacts of relay switch 440 to output line 473 and thereby to output circuitry and orderwire 17A.

Figure 8:
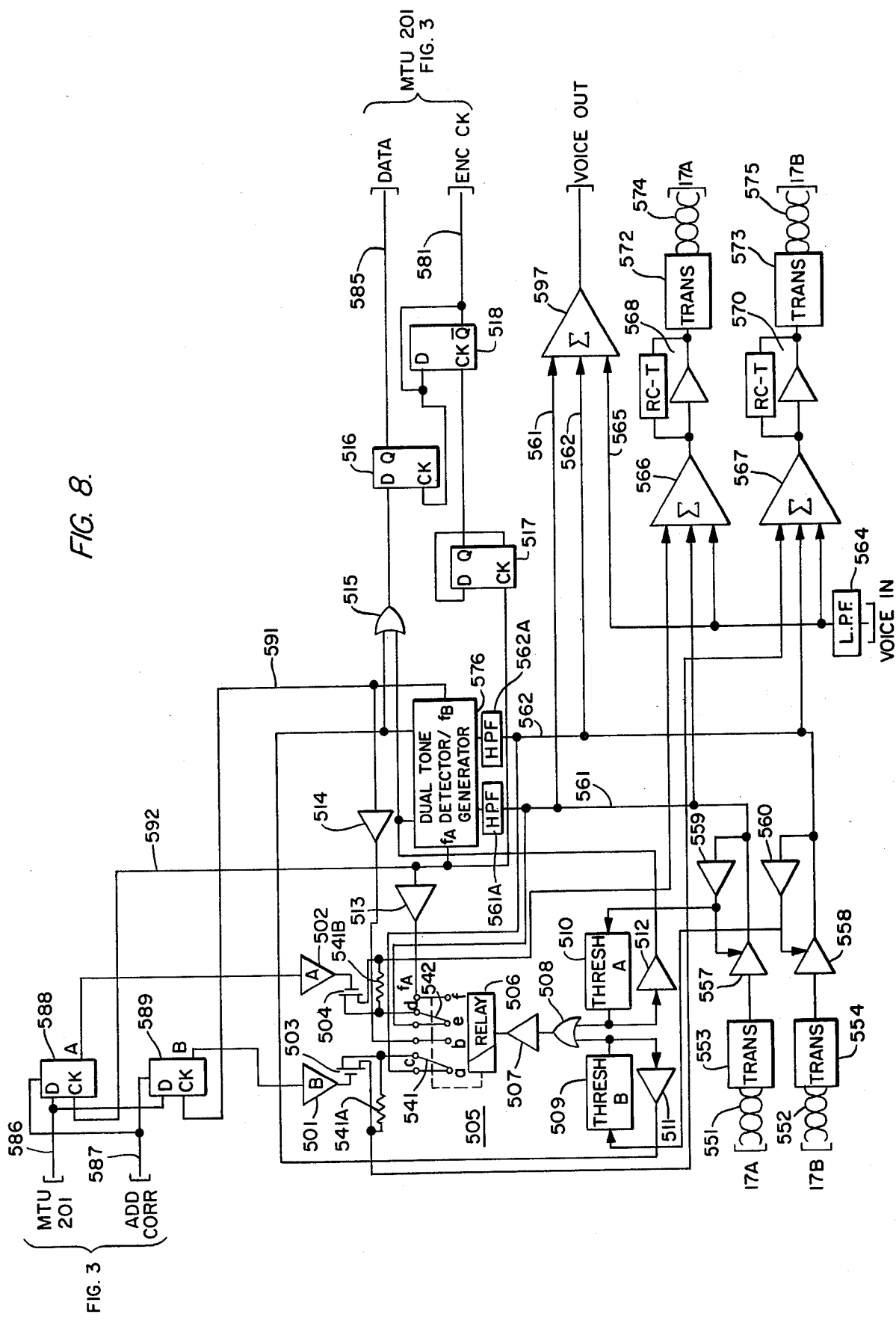
FIG. 8 is a schematic block diagram of a signal interface unit portion of an orderwire interface transceiver module for a repeater station in the second embodiment of the invention.

Signal Interface Unit for Repeater Station (FIG. 8)

Referring now to FIG. 8 the signal interface unit for a repeater station of the second embodiment of the invention is depicted as comprising a pair of orderwire cable input links 551 and 552 and output lines 514 and 575, each formed of a twisted pair orderwire cable for cable links 17A and 17B, respectively. As was pointed out previously, cable link 17A conveys communications at frequency $f_1$ directed from west-to-east along the orderwire, while cable link 17B conveys communications at carrier frequency $f_2$ directed from east-to-west. Whereas a terminal station interface unit shown in FIG. 7 is located at one end (e.g., the west end) of the orderwire cable and therefore sources communications in one direction, a repeater station is configured to convey communications in both directions so that it must be capable of receiving and transmitting communications over each of cables 17A and 17B. Each incoming twisted pair 551 and 552 is coupled to a respective isolation transformer 553,554. The output of each respective transformer is coupled through AGC amplifiers 557 and 558 to lines 561 and 562. Line 561 is coupled through a high pass filter to one input of a dual tone detector/generator 576 and to an AGC feedback amplifier 559. The output of amplifier 559 is coupled to the control input of AGC amplifier 557 and to a threshold detector 510. Line 562 is coupled through a second high pass filter to a second input of dual tone detector/generator 576 and to an AGC feedback amplifier 560. The output of amplifier 560 is coupled to the control input of amplifier 558 and to a threshold detector 509. As in the signal interface circuit shown in FIG. 7, described above, threshold detectors 509 and 510 monitor the presence or absence of carrier on orderwire cables 17A and 17B by comparing the outputs of feedback amplifiers 559 and 560 (the gain control signals) with a reference threshold approximating maximum gain, thereby triggering the threshold detector (509 or 510) and coupling an output through OR gate 508 to relay driver 507. The outputs of threshold detectors 509 and 510 are further coupled through buffer amplifiers 511 and 512 to the tone detected outputs of unit 576 and to OR gate 515. As in the signal interface unit for a terminal station, a loss of carrier causes the threshold circuit associated with that carrier to latch one input of OR gate 515 at zero so that the encode/decode control unit (FIG. 3) sees no data on that channel and therefore generates no response to be sent out on the opposite channel. Namely, for a loss of carrier on east-to-west orderwire cable 17B, threshold detector 509 couples a signal through amplifier 511 to the $f_2$ detected output of unit 576 and one input of OR gate 515. OR gate 515 is now incapable of coupling data to MTU 201 in the encode/decode control unit of the repeater. The output of OR gate 515 is coupled to the d input of flip-flop 516, the $\bar{Q}$ output of which is coupled over line 585 to MTU 201 (FIG. 3). The clock input of flip-flop 516 is derived from flip-flop 518 which is coupled to the $f_1$ generation output of unit 576 via line 592. Flip-flops 517 and 518 provide a clean divided-down clock in line 581 for synchronous operation of the encode/decode control unit (FIG. 3). Like the terminal interface units, the repeater operates in accordance with the 20.48 KHz clock (frequency $f_1$) to provide for single substitution of repeater cards and the requisite commonality throughout the systems.

Response message assembled by the encode/decode control unit (FIG. 3) are coupled to a pair of flip-flops 588 and 589 from MTU data line 586 and address correlate line 587 just as in the first embodiment. Flip-flops 588 and 589 are clocked by the $f_1$ and $f_2$ outputs of dual tone detector/generator unit 576, respectively, the $\bar{Q}$ outputs of the flip-flops being coupled to buffer amplifier 502 and 501, respectively. Buffer amplifier 502 is coupled to the gate of FET switch 504, the source and drain of which are coupled between terminal d of relay switch 505 and one intput of summing amplifier 566. As in the terminal unit, resistors 541A and 541B provide for adjustment of the modulation index. Summing amplifier 566, equalizer circuit 568 and transformer 572 form the output circuit for the repeater signal interface unit to orderwire cable 17A. Similarly, summing amplifier, one input of which is coupled to the drain of FET switch 503, equalizer 570 and output transformer 573 from the output circuit to orderwire cable 17B. The drain of FET switch 503 is coupled to terminal c of relay switch 505.

Terminal a of the relay switch is coupled to $f_2$ input signal line 562, while terminal c is coupled to $f_1$ input signal line 561. Terminals b and f are coupled, via buffer amplifiers 514 and 513, respectively, to the $f_2$ and $f_1$ carrier outputs of tone detector/generator unit 576. During normal operation, with relay coil 506 being non-energized, the carrier input on lines 562 and 561 are coupled through normally bridged terminals a-c and e-d by normally closed contacts 541 and 542 to the source drain path of FET switches 503 and 504. Response messages are applied to the gate of FET switches 503 and 504 to modulate the carrier applied to the source-drain circuit paths of the FET switches for transmission out over the corresponding orderwire cable via summing amplifiers 566 and 567. (It should also be noted that incoming signals on orderwire cables 17A and 17B are coupled via lines 561 and 562 to summing amplifiers 566 and 567 for delivery to transformers 572 and 573 to cable twisted pairs 574 and 575.)

In the event of loss of carrier on either orderwire channel, west-to-east or east-to-west, the associated one of threshold detectors 509 and 510 will change state, causing movable contacts 541 and 542 to interrupt the normally closed connection between terminals a-c and e-d and make the connection between terminals b-c and d-f. Carrier is now supplied from tone detector/generator 576 to FET switches 503 and 504 via the newly closed terminal connections, so that the repeater may still communicate with an associated supervisory control unit at a terminal station via its own generated carrier.

It should be noted that the switching configuration shown in FIG. 8 operates to sever the uplink connection in the event of a fault but still provides downlink communication capability. Namely, considering repeater 11-1 as an example, for a loss of carrier on east-to-west orderwire cable 17B, threshold detector 509 will cause relay circuit 505 to be energized and, at the same time, will inhibit gate 515 from receiving a zero/one level change for frequency $f_2$. Therefore, no messages on the $f_2$ carrier will be received by repeater 11-1. However, a new $f_2$ carrier provided by unit 576 irrespective of the existence of carrier $f_2$ on line 562 will be supplied to FET switch 503 so that repeater 11-1 can still send response messages to terminal station 10 over orderwire cable 17B. Since threshold detector 510 has not been triggered, incoming messages on carrier $f_1$ are still detected and output through OR gate 515 to the repeater's encode/decode control unit (FIG. 3), whereby a response message can be assembled and coupled to FET switch 503 which, in turn, modulates the $f_2$ carrier supplied by unit 576 for delivery downlink to terminal station 10.

Thus, in accordance with the second embodiment of the invention, single frequencies are employed for message transmission over the respective orderwire cables (east-to-west and west-to-east) of the network, as contrasted to the use of dual frequencies for both highways. In addition, loss of carrier does not defeat the operation of the entire network, as each signal interface unit is equipped to switch in a new carrier in response to loss of signal, so that it may communicate with its associated supervisory control unit in a terminal station. As will be appreciated from the foregoing description of the components and operation of the orderwire communication system of the present invention, auxiliary communications attendant to the control and operation of a multi-station, multilink communication network can be effected through a scheme that affords the selective interrogation of all stations along the network through encoded signalling while enabling voice communications to be carried simultaneously over the same message highway. The manner in which the frequency carrier pair is formatted for both uplink and downlink message transmission facilitates the configuration of the communication modules disposed in each station. Advantageously, this leads to the use of the same encoding/decoding circuitry for every station thereby enhancing the modularity of the overall distributed system.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. For use in a communication system wherein information signals are to be conveyed among a plurality of stations distributed along a shared communication link, said link having a first portion for carrying messages in a first direction along said link and a second portion for carrying messages in a second direction along said link, a station transceiver for receiving messages transmitted to it and transmitting response messages in reply thereto comprising:
    first means, coupled to said link, for receiving a first incoming message transmitted over said first portion of said link at a first prescribed carrier frequency; and
    second means, coupled to said link, for transmitting an outgoing message over said second portion of said link at said first prescribed carrier frequency and over said first portion of said link at a second prescribed carrier frequency different from said first prescribed frequency.

2. A station transceiver according to claim 1, wherein said first means further comprises means, coupled to said link, for receiving a second incoming message transmitted over said second portion of said link at said second carrier prescribed frequency; and wherein
    said second means includes means for transmitting said outgoing response message in response to receipt of either of said first and second incoming messages.

3. A station transceiver according to claim 2, wherein messages conveyed over said link are in the form of digitally encoded signals carried on said first and second prescribed carrier frequencies.

4. A station transceiver according to claim 2, wherein said messages conveyed over said link are in the form of amplitude modulated ones of said first and second prescribed carrier frequencies.

5. A station transceiver according to one of claims 1, 3 and 4, wherein said transceiver further comprises means for receiving voice signals carried over said link and means for transmitting voice signals onto said link in response to voice signals applied externally thereto.

6. A station transceiver according to one of claims 2, 3 and 4, wherein said transceiver further comprises means for receiving voice signals carried over either of said first and second portions of said link, and means for transmitting voice signals externally applied thereto onto both said first and second portions of said link.

7. A station transceiver according to claim 3, wherein said first means includes means for removing the digitally encoded message from the received carrier frequency, and means for storing said digitally encoded message in preparation for the generation and transmission of an outgoing message in reply thereto.

8. A station transceiver according to claim 2, wherein said transceiver includes dual frequency detector/generator for detecting incoming messages on either of said first and second prescribed carrier frequencies and for generating said first and second prescribed carrier frequencies on which an outgoing response message is to be transmitted.

9. A station transceiver according to claim 7, wherein second means includes means for transmitting as part of said outgoing response message said stored digitally encoded message.

10. A station transceiver according to claim 7, wherein each message includes an address portion identifying the station to whom the message is transmitted, and said first means includes means for storing said digitally encoded message upon detecting that the address portion of a message transmitted over said link corresponds to the address of its associated station.

11. A station transceiver according to claim 8, wherein each message includes an address portion identifying the station to whom the message is transmitted, and said first means includes means for storing said digitally encoded message upon detecting that the address portion of a message transmitted over said link corresponds to the address of its associated station; and wherein first means includes means for inhibiting said second means from transmitting an outgoing response message on said first and second frequencies until said storing means detects that the address portion of a message transmitted over said link corresponds to the address of its associated station.

12. For use in a communication system wherein information signals are to be conveyed among a plurality of stations distributed along a shared communication link, said link having a first portion for carrying messages in a first direction along said link and a second portion for carrying messages in a second direction along said link, a station transceiver for transmitting to another station, and for receiving messages transmitted to it and transmitting response messages in reply thereto comprising:
    first means, coupled to said link, for transmitting an outgoing message on a selected one of first and second prescribed carrier frequencies over said first portion of said link; and
    second means, coupled to said link, for receiving an incoming message on either of said first and second prescribed carrier frequencies over said second portion of said link.

13. A station transceiver according to claim 12, wherein said first means includes means for transmitting a first outgoing message on said first prescribed carrier frequency over said first portion of said link to said another station on said link, so as to cause said another station to transmit a response message, and wherein said second means includes means for receiving said response message transmitted on said first prescribed carrier frequency on said second portion of said link.

14. A station transceiver according to one of claims 12 and 13, wherein said second means includes means for receiving an incoming message on said second prescribed carrier frequency over said second portion of said link and causing said first means to transmit an outgoing message in response thereto on said second prescribed carrier frequency over said first portion of said link.

15. A station transceiver according to claim 12, wherein said transceiver further comprises means for receiving voice signals carried over said link and means for transmitting voice signals onto said link in response to voice signals applied externally thereto.

16. A station transceiver according to claim 12, wherein messages conveyed over said link are in the form of digitally encoded signals carried on a respective one of said first and second prescribed carrier frequencies.

17. A station transceiver according to claim 12, wherein said transceiver further includes means for receiving voice signals carried over said second portion of said link, and means for transmitting voice signals externally applied thereto on said first portion of said link.

18. A station transceiver according to claim 16, wherein said second means includes means for removing the digitally encoded message from the received carrier frequency, and means for storing said digitally encoded message in preparation for the generation and transmission of an outgoing message in response thereto.

19. A station transceiver according to one of claims 12, 13 and 14, wherein said transceiver includes a frequency detector/generator for detecting incoming messages on either of said first and second prescribed carrier frequencies and for generating said second prescribed carrier frequency on which an outgoing response message is to be transmitted.

20. A station transceiver according to claim 14, wherein messages conveyed over said link are in the form of digitally encoded signals carried on a respective one of said first and second prescribed carrier frequencies.

21. A station transceiver according to claim 20, wherein said second means includes means for removing the digitally encoded message from the received carrier frequency, and means for storing said digitally encoded message in preparation for the generation and transmission of an outgoing message in response thereto.

22. A station transceiver according to claim 21, wherein said first means includes means for transmitting as part of an outgoing response message said stored digitally encoded message.

23. A station transceiver according to claim 18, wherein each message includes an address portion identifying the station to whom the message is transmitted, and said second means includes means for storing said digitally encoded message upon detecting that the address portion of a message transmitted over said link corresponds to the address of its associated station.

24. A station transceiver according to claim 19, wherein each message includes an address portion identifying the station to whom the message is transmitted, and said second means includes means for storing said digitally encoded message upon detecting that the address portion of a message transmitted over said link corresponds to the address of its associated station; and wherein said second means includes means for inhibiting said first means from transmitting an outgoing message on said second frequency until said storing means detects that the address portion of a message transmitted over said link corresponds to the address of its associated station.

25. A communication system wherein information signals are to be conveyed among a plurality of stations distributed along a shared communications link, said link having a first portion for carrying messages in a first direction along said link and a second portion for carrying messages in a second direction along said link, each of said stations having input/output devices that may be impacted by messages carried over said link, comprising:
   a first terminal station coupled to said link and having a transceiver for transmitting outgoing messages over said first portion of said link to one of a plurality of intermediate stations and a second terminal station at a first prescribed carrier frequency and receiving messages, conveyed over said second portion of said link from one of said intermediate and second terminal stations, at either of said first prescribed carrier frequency and a second prescribed carrier frequency;
   a second terminal station coupled to said link and having a transceiver for transmitting outgoing messages over said second portion of said link to one of said intermediate and first terminal stations at said second prescribed carrier frequency and receiving messages, conveyed over said first portion of said link from one of said intermediate and first terminal stations, at either of said first and second prescribed carrier frequencies; and
   a plurality of intermediate stations coupled to said link, each having a transceiver for receiving incoming messages from said first terminal station on said first portion of said link at said first prescribed carrier frequency and for receiving incoming messages from said second terminal station on said second portion of said link at said second prescribed carrier frequency, and for transmitting outgoing response messages on said first portion of said link at said second prescribed carrier frequency and on said second portion of said link at said first prescribed carrier frequency.

26. A communication system according to claim 25, wherein each of said first and second terminal stations comprises means for transmitting outgoing messages in response to receipt of messages at either of said first and second prescribed carrier frequencies.

27. A communication system according to claim 25, wherein messages conveyed over said link are in the form of digitally encoded signals carried on said first and second prescribed carrier frequencies.

28. A communication system according to claim 25, wherein each of said stations further comprises means for receiving voice signals carried over said link and means for transmitting voice signals over said link in response to voice signals applied externally thereto.

29. A communication system according to claim 27, wherein each station includes means for removing the digitally encoded message from the received carrier frequency and means for storing said digitally encoded message in preparation for the generation and transmission of an outgoing message in reply thereto.

30. A communication system according to claim 25, wherein each terminal station includes a dual frequency detector/generator for detecting incoming messages on either of said first and second prescribed carrier frequencies and for generating one of said first and second prescribed carrier frequencies on which an outgoing message is to be transmitted.

31. A communication system according to claim 29, wherein each message includes an address portion identifying the station to whom the message is transmitted, and each station includes means for storing said digitally encoded message upon detecting that the address portion of a message transmitted over said link corresponds to its own address.

32. A communication system according to claim 25, wherein each of said terminal stations is coupled to receive information signals to be transmitted as a message to impact upon the input/output device associated with one of said stations and includes means for coupling said message to the station with which said input/output device is associated.

33. A communication system according to claim 32, wherein a terminal station includes means for causing an information signal generated thereat for impacting upon the input/output device associated with said station exclusive of said link.

34. A communication system according to claim 25, wherein each message includes an address portion identifying the station to whom the message is transmitted, and each station includes means for storing said digitally encoded message upon detecting that the address portion of a message transmitted over said link corresponds to its own address.

35. A communication system according to claim 34, wherein a terminal station includes means for causing an information signal generated thereat as an outgoing message to be coupled to said link and to said storing means exclusive of the transmission of said outgoing message over said link.

36. For use in a communication system wherein information signals are to be conveyed among a plurality of stations distributed along a shared communication link, said link having a first portion for carrying messages in a first direction along said link and a second portion for carrying messages in a second direction along said link, a station transceiver for receiving messages transmitted to it and transmitting response messages in reply thereto comprising:
first means, coupled to said link, for receiving a first incoming message transmitted over said first portion of said link at one of first and second prescribed carrier frequencies; and
second means, coupled to said link, for transmitting an outgoing message over said second portion of said link at one of said first and second prescribed carrier frequencies and over said first portion of said link at the other of said first and second prescribed carrier frequencies.

37. A station transceiver according to claim 36, wherein said first means comprises means, coupled to said link, for receiving a first incoming message transmitted over said first portion of said link at said first prescribed carrier frequency; and
said second means includes means for transmitting an outgoing message over said second portion of said link at said second prescribed frequency and over said first portion of said link at said first prescribed carrier frequency.

38. A station transceiver according to claim 36, wherein said first means further comprises means, coupled to said link, for receiving a second incoming message transmitted over said second portion of said link at said second carrier prescribed frequency; and wherein said second means includes means for transmitting said outgoing message in response to receipt of either of said first and second incoming messages.

39. A station transceiver according to claim 38, wherein messages conveyed over said link are in the form of digitally encoded signals carried on said first and second prescribed carrier frequencies.

40. A station transceiver according to claim 36, wherein said second means includes means responsive to a reduction of received level of carrier frequencies below a prescribed threshold on said first portion of said link, for generating the carrier frequency corresponding to reduced level carrier frequency and causing the generated carrier frequency to be applied to said first portion of said link.

41. A station transceiver according to claim 38, wherein said second means includes means, responsive to a reduction of level of each of said carrier frequencies below a prescribed threshold on said first and second portions of said link, for generating the reduced level carrier frequency and causing the generated carrier frequency to be applied to the corresponding one of said first and second portions of said link.

42. A station transceiver according to claim 37, wherein said second means includes means responsive to a reduction of level of carrier frequencies below a prescribed threshold on said first portion of said link, for generating the carrier frequency corresponding to the reduced level carrier frequency and causing the generated carrier frequency to be applied to said first portion of said link.

43. A station transceiver according to claim 42, wherein said second means further includes means for inhibiting the transmission of messages over said first portion of said link in response to said reduction in level of carrier frequency.

44. A station transceiver according to claim 41, wherein said second means includes means for inhibiting the transmission of messages over that one of said first and second portions of said link other than the portion of the link having a reduction in carrier frequency, in response to said reduction in level of carrier frequency.

45. A station transceiver according to claim 38, wherein said messages conveyed over said link are in the form of amplitude modulated ones of said first and second prescribed carrier frequencies, and wherein said transceiver further comprises means for receiving voice signals carried over said link and means for transmitting voice signals onto said link in response to voice signals applied externally thereto.

46. A station transceiver according to claim 45, wherein said transceiver further comprises means for receiving voice signals carried over either of said first and second portions of said link, and means for transmitting voice signals externally applied thereto onto both said first and second portions of said link.

47. A station transceiver according to claim 39, wherein said first means includes means for removing the digitally encoded message from the received carrier frequency, and means for storing said digitally encoded message in preparation for the generation and transmission of an outgoing message in reply thereto.

48. A station transceiver according to claim 38, wherein said transceiver includes a dual frequency detector/generator for detecting incoming messages on either of said first and second prescribed carrier frequencies and for generating said first and second prescribed carrier frequencies on which an outgoing message is to be transmitted.

49. A station transceiver according to claim 47, wherein second means includes means for transmitting as part of said outgoing message said stored digitally encoded message.

50. A station transceiver according to claim 47, wherein each message includes an address portion identifying the station to whom the message is transmitted, and said first means includes means for storing said digitally encoded message upon detecting that the address portion of a message transmitted over said link corresponds to the address of its associated station.

51. A station transceiver according to claim 48, wherein each message includes an address portion identifying the station to whom the message is transmitted, and said first means includes means for storing said digitally encoded message upon detecting that the address portion of a message transmitted over said link corresponds to the address of its associated station; and wherein said first means includes means for inhibiting said second means from transmitting an outgoing message on said first and second frequencies until said storing means detects that the address portion of a message transmitted over said link corresponds to the address of its associated station.

52. For use in a communication system wherein information signals are to be conveyed among a plurality of stations distributed along a shared communication link, said link having a first portion for carrying messages in a first direction along said link and a second portion for carrying messages in a second direction along said link, a station transceiver for transmitting to another station, and for receiving messages transmitted to it and transmitting response messages in reply thereto comprising:
  first means, coupled to said link, for transmitting an outgoing message on a selected one of first and second prescribed carrier frequencies over said first portion of said link; and
  second means, coupled to said link, for receiving an incoming message on the other of said first and second prescribed carrier frequencies over said second portion of said link.

53. A station transceiver according to claim 52, wherein said second means includes means for receiving an incoming message on said second prescribed carrier frequency over said second portion of said link and causing said first means to transmit an outgoing message in response thereto on said first prescribed carrier frequency over said first portion of said link.

54. A station transceiver according to claim 53, wherein said transceiver further comprises means for receiving voice signals carried over said link and means for transmitting voice signals onto said link in response to voice signals applied externally thereto.

55. A station transceiver according to claim 52, wherein messages conveyed over said link are in the form of digitally encoded signals carried on a respective one of said first and second prescribed carrier frequencies.

56. A station transceiver according to claim 52, wherein said transceiver further includes means for receiving voice signals carried over said second portion of said link, and means for transmitting voice signals externally applied thereto on said first portion of said link.

57. A station transceiver according to claim 55, wherein said second means includes means for removing the digitally encoded message from the received carrier frequency, and means for storing said digitally encoded message in preparation for the generation and transmission of an outgoing message in response thereto.

58. A station transceiver according to claim 52, wherein said transceiver includes a frequency detector/generator for detecting incoming messages on either of said first and second prescribed carrier frequencies and for generating said second prescribed carrier frequency on which an outgoing response message is to be transmitted.

59. A station transceiver according to claim 53, wherein messages conveyed over said link are in the form of digitally encoded signals carried on a respective one of said first and second prescribed carrier frequencies.

60. A station transceiver according to claim 59, wherein said second means includes means for removing the digitally encoded message from the received carrier frequency, and means for storing said digitally encoded message in preparation for the generation and transmission of an outgoing message in response thereto.

61. A station transceiver according to claim 60, wherein said first means includes means for transmitting as part of an outgoing response message said stored digitally encoded message.

62. A station transceiver according to claim 57, wherein each message includes an address portion identifying the station to whom the message is transmitted, and said second means includes means for storing said digitally encoded message upon detecting that the address portion of a message transmitted over said link corresponds to the address of its associated station.

63. A station transceiver according to claim 58, wherein each message includes an address portion identifying the station to whom the message is transmitted, and said second means includes means for storing said digitally encoded message upon detecting that the address portion of a message transmitted over said link corresponds to the address of its associated station; and wherein said second means includes means for inhibiting said first means from transmitting an outgoing message on said second frequency until said storing means detects that the address portion of a message transmitted over said link corresponds to the address of its associated station.

64. A station transceiver according to claim 53, wherein said second means includes means, responsive to a reduction of level of carrier frequency below a prescribed threshold on either of said first and second portions of said link, for generating the carrier frequency corresponding to the reduced level carrier frequency and causing the generated carrier frequency to be applied to the corresponding portion of said link by said first means.

65. A station transceiver according to claim 64, wherein said second means includes means for inhibiting said first means from transmitting an outgoing message to that portion of said link other than said corresponding portion of said link in response to said reduction inlevel of carrier frequency.

66. A station transceiver according to claim 52, wherein sais first means includes means for transmitting a first outgoing message on said first prescribed carrier frequency over said first portion of said link to said another station on said link, so as to cause said another station to transmit a response message, and wherein said second means includes means for receiving said response message transmitted on said second prescribed carrier frequency on said second portion of said link.

67. A communication system wherein information signals are to be conveyed among a plurality of stations distributed along a shared communications link, said link having a first portion for carrying messages in a first direction along said link and a second portion for carrying messages in a second direction along said link, each of said stations having input/output devices that may be impacted by messages carried over said link, comprising:
a first terminal station coupled to said link and having a transceiver for transmitting outgoing messages over said first portion of said link to one of a plurality of intermediate stations and a second terminal station at a first prescribed carrier frequency and receiving messages, conveyed over said second portion of said link from one of said intermediate and second terminal stations, at a second prescribed carrier frequency;
a second terminal station coupled to said link and having a transceiver for transmitting outgoing messages over said second portion of said link to one of said intermediate and first terminal stations at said second prescribed carrier frequency and receiving messages, conveyed over said first portion of said link from one of said intermediate and first terminal stations, at said first prescribed carrier frequency; and
a plurality of intermediate stations coupled to said link, each having a transceiver for receiving incoming messages from said first terminal station on said first portion of said link at said first prescribed carrier frequency and for receiving incoming messages from said second terminal station on said second portion of said link at said second prescribed carrier frequency, and for transmitting outgoing response messages on said first portion of said link at said first prescribed carrier frequency and on said second portion of said link at said second prescribed carrier frequency.

68. A communication system according to claim 67, wherein each transceiver includes means responsive to a reduction of carrier frequency on a respective portion of said link by way of which the transceiver receives messages, for generating a carrier frequency corresponding to the reduced carrier frequency and causing the generated carrier frequency to be applied to said respective portion of said link.

69. A communication system according to claim 68, wherein messages conveyed over said link are in the form of digitally encoded signals carried on said first and second prescribed carrier frequencies.

70. A communication system according to claim 68, wherein each of said stations further comprises means for receiving voice signals carried over said link and means for transmitting voice signals over said link in response to voice signals applied externally thereto.

71. A communication system according to claim 69, wherein each station includes means for removing the digitally encoded message from the received carrier frequency and means for storing said digitally encoded messages in preparation for the generation and transmission of an outgoing message in reply thereto.

72. A communication system according to claim 67, wherein each terminal station includes a dual frequency detector/generator for detecting incoming messages on either of said first and second prescribed carrier frequencies and for generating that one of said first and second prescribed carrier frequencies on which an outgoing message is to be transmitted.

73. A communication system according to claim 71, wherein each message includes an address portion identifying the station to whom the message is transmitted, and each station includes means for storing said digitally encoded message upon detecting that the address portion of a message transmitted over said link corresponds to its own address.

74. A communication system according to claim 67, wherein each of said terminal stations is coupled to receive information signals to be transmitted as a message to impact upon the input/output device associated with one of said stations and includes means for coupling said message to the station with which said input/out device is associated.

75. A communication system according to claim 74, wherein a terminal station includes means for causing an information signal generated thereat for impacting upon the input/output device associated with said station exclusive of said link.

76. A communication system according to claim 67, wherein each message includes an address portion identifying the station to whom the message is transmitted, and each station includes means for storing said digitally encoded message upon detecting that the address portion of a message transmitted over said link corresponds to its own address.

77. A communication system according to claim 76, wherein a terminal station includes means for causing an information signal generated thereat as an outgoing message to be coupled to said link and to said storing means exclusive of the transmission of said outgoing message over said link.

78. A communication system according to claim 68, wherein each transceiver further includes means for inhibiting the transmission of messages over that portion of said link other than said respective portion of said link in response to said reduction in carrier frequency.

* * * * *